United States Patent
Merry

(10) Patent No.: US 12,441,378 B2
(45) Date of Patent: Oct. 14, 2025

(54) REMOTE ENGINE SPEED CONTROL

(71) Applicant: BNSF Railway Company, Fort Worth, TX (US)

(72) Inventor: Nathaniel W. Merry, Kansas City, MO (US)

(73) Assignee: BNSF Railway Company, Fort Worth, TX (US)

( * ) Notice: Subject to any disclaimer, the term of this patent is extended or adjusted under 35 U.S.C. 154(b) by 49 days.

(21) Appl. No.: 18/506,012

(22) Filed: Nov. 9, 2023

(65) Prior Publication Data

US 2024/0149930 A1     May 9, 2024

Related U.S. Application Data

(63) Continuation of application No. 18/052,782, filed on Nov. 4, 2022, now Pat. No. 11,851,094.

(51) Int. Cl.
*B61L 27/10*     (2022.01)
*B61L 25/02*     (2006.01)

(52) U.S. Cl.
CPC ............ *B61L 25/021* (2013.01); *B61L 27/10* (2022.01)

(58) Field of Classification Search
None
See application file for complete search history.

(56) References Cited

U.S. PATENT DOCUMENTS

| | | | |
|---|---|---|---|
| 5,758,848 A * | 6/1998 | Beule | B61L 17/00 |
| | | | 701/19 |
| 6,789,004 B2 | 9/2004 | Brousseau et al. | |
| RE39,758 E | 8/2007 | Horst et al. | |
| 7,529,201 B2 | 5/2009 | Aiken, II et al. | |
| 7,770,847 B1 | 8/2010 | Severson | |
| 8,030,871 B1 | 10/2011 | Young et al. | |
| 8,311,689 B2 | 11/2012 | Plawecki et al. | |
| 8,380,361 B2 | 2/2013 | Evans | |
| 8,483,887 B2 | 7/2013 | Ecton et al. | |

(Continued)

OTHER PUBLICATIONS

Ermak, G. & Vasilev, Alexandr & Varavin, Anton & Vladislav, Noskov & Ignatkov, Kirill, Radar sensors for hump yard and rail crossing applications, Dec. 31, 2013.

*Primary Examiner* — James M McPherson
(74) *Attorney, Agent, or Firm* — Whitaker Chalk Swindle & Schwartz PLLC; Enrique Sanchez, Jr.; Juan Vasquez

(57) ABSTRACT

Methods and systems for selection of a control speed for a remote-controlled vehicle based on rulesets applied to control nodes within a viewing window. In embodiments, a viewing window including control nodes, each having a having ruleset defining operating conditions associated therewith, may be determined. The ruleset for a control node may define operating limitations (e.g., speed limitations, orientation limitations, etc.) at the control node. In embodiments, a control speed plan for the viewing window may be generated based on the operating conditions for each control node within the current viewing window based on the limitations associated with each control node. The control speed plan may include an optimal control speed at each control node within the viewing window and a speed profile indicating an acceleration or deceleration curve to be followed through each of the optimal control speeds in the control speed plan when executing the control speed plan.

20 Claims, 13 Drawing Sheets

(56) References Cited

U.S. PATENT DOCUMENTS

| | | |
|---|---|---|
| 8,989,917 B2 | 3/2015 | Kumar |
| 2009/0126170 A1 | 5/2009 | Guerra et al. |
| 2009/0198391 A1 | 8/2009 | Kumar et al. |
| 2010/0262321 A1* | 10/2010 | Daum ................ B61L 27/16 |
| | | 701/19 |
| 2016/0009304 A1 | 1/2016 | Kumar et al. |
| 2016/0091320 A1 | 3/2016 | Kapp et al. |
| 2016/0257324 A1 | 9/2016 | Kono et al. |
| 2016/0297456 A1* | 10/2016 | Nameki ............ B61L 25/021 |
| 2018/0356814 A1 | 12/2018 | Brooks |

\* cited by examiner

Cut Speed Table (210, 220)

| Entry Name | Cut Car Count (exact) | Crest Speed (MPH) |
|---|---|---|
| Singles | 1 | 2.0 |
| Doubles | 2 | 2.5 |
| Triples | 3 | 3.0 |
| Quads | 4 | 3.2 |
| Fives | 5 | 3.3 |
| Sixes | 6 | 3.4 |
| Seven,+ | <Unlimited no rule needed> | |

Destination Track Speed Table (222)

| Entry Name | Car Destination | Next Car Destination | Crest Speed (MPH) |
|---|---|---|---|
| Neighboring Track | 2021 | 2022, 2020 | 1.9 |
| Downhill Track (ARG Bowl Layout) | 2005 | 2004,2003,2002,2001,2071,2072 | 1.9 |
| Same Destination | | <Unlimited no rule needed> | |
| Same Group | RTG2130 | RTG2130 | 2.5 |
| Neighboring Group | RTG2130 | RTG3140, RTG1120 | 3.0 |

Car Speed Table (224)

| Entry Name | Cut Car Count (exact) | AAR Car Kind | Min Car Length | Max Car Length | SCH Rule | Crest Speed (MPH) |
|---|---|---|---|---|---|---|
| Boxcars Pin Lifters | | A* | | | | 2.0 |
| Reefers | | R* | | | | 2.0 |
| Bad Orders | | | | | BO | 2.5 |
| Short Singles | 1 | | 0 | 45 | | 1.9 |

HESC Config (230)

| HESC Config | Default |
|---|---|
| Maximum Hump Speed (mph) | 5.0 |
| RCO Acceleration (ft/s/s) | |
| RCO Deceleration (ft/s/s) | |
| Max Pin Pull Speed (mph) | 3.0 |
| Last Pin Pull (EOT) | 0.0 |

FIG. 2

REMOTE ENGINE SPEED CONTROL

CROSS-REFERENCE TO RELATED APPLICATIONS

The present application is a Continuation of U.S. patent application Ser. No. 18/052,782, filed Nov. 4, 2022, the entirety of which is hereby incorporated by reference for all purposes.

TECHNICAL FIELD

The present invention relates generally to speed control systems, and more particularly to selection of a control speed for a remote-control engine based on a set of rules within a viewing window.

BACKGROUND

Transportation systems and devices are of vital importance and enable us to travel distances that might otherwise be impossible to travel and/or to move things that might otherwise be impossible to move. For example, transportation vehicles provide us with the means to transport freight and people long distances, or short distances as might be desired or needed. Transportation vehicles, however, rely on engines to provide the power necessary to move the vehicles at desired speeds. In some cases, at least part of the functionality of vehicles may be remote controlled. In these cases, the remote-controlled functionality may be provided by a remote-control system that may determine values that may be used by the remote-controlled vehicle to perform operations.

In particular implementations of a transportation system, a locomotive engine may be configured with remote-controlled functionality. In these implementations, the remote-controlled engine may be controlled to move at a desired speed, which may be a control speed requested by an operator. For example, an operator may desire a remote-controlled engine to travel at a particular control speed. The operator may request the particular control speed from the remote-controlled engine. The remote-controlled engine may, in response to receiving the request for the particular control speed, modify its speed, if necessary, to travel at the control speed. This functionality is very useful as it provides a means for controlling the speed of a remote-controlled engine in different situations.

One particular situation in which controlling the speed of a remote-controlled engine is particularly useful is in hump yard applications. A hump yard may refer to an area configured to route railroad cars along a network of marshalling tracks using gravity to respectively assigned trains using remote-controlled engines. In this manner, the hump yard may enable operators to assemble trains by routing the railroad cars to their assigned train. Typically, hump yards consist of an elevated area (e.g., a hump, which may be artificial or natural, such as a hill, mound, etc.) along which a track section is run. The track section may include an approach section, a top of the hump, and a release area, which may branch out into multiple marshaling tracks. In operation, a stock train including the railroad cars to be marshaled, which may be uncoupled from each other, may be pushed by a hump push engine at a set speed along the approach section to the top of the hump. As the railroad cars roll past the apex (e.g., the top) of the hump, gravity may begin pulling the railroad cars towards the bottom of the hump causing individual railroad cars, or groups of railroad cars, to separate from the stock train and to coast to the release area at a release speed. The separated railroad cars may coast at a release speed (and may decelerate) to the release area at which point each car, or each group of railroad cars, may be diverted by switching devices onto respectively assigned marshaling tracks. In some cases, the switch may be reset to marshal the next individual railroad car, or the next group of railroad cars, to the appropriate marshalling track. The switch may marshal the railroad cars according to the type of the individual railroad car and/or the load being carried. A pull hump engine may then be used to pull the assembled trains from the respective marshalling tracks.

In the hump yard example above, maintaining a distance between the railroad cars that may roll onto the various marshalling tracks is very important in order to prevent the rolling railroad cars from colliding with each other, as well as to ensure that the switches may be reset in time to marshal the next railroad car to the appropriate train. For example, if two consecutive railroad cars assigned to different marshaling tracks are released from the top of the hump too close together, there may not be sufficient time to reset the switch after the first railroad car is diverted to its respective marshalling track to ensure that the second railroad car is diverted to the appropriate marshalling track. To address these issues, current hump yard systems provide mechanisms to regulate the speed of the hump push engine and the speed of the hump pull engine. A fast-moving hump push engine may cause the railroad cars to release close to each other, while a slower moving hum push engine may cause the railroad cars to release with more distance between each other. The hump push engine and/or the hump pull engine may be remote-controlled by an operator. In these examples, the operator may determine a control speed at which the engines should travel to push and/or to pull the railroad cars and may request, via the remote-control functionality, the determined control speed from the hump push engine or hump pull engine. Similarly, an operator may determine a control speed for the hump pull engine and may request the control speed from the hump pull engine for pulling the assembled trains from the marshalling tracks.

However, currently, determining the control speed at which a remote-controlled engine is to travel may be determined by the operator. When the operator desires to apply a different speed, the operator may request the different speed from the remote-controlled engine. However, this approach is inefficient, as there may be occasions in which the engine may be able to move faster, even if for a moment, but the operator does not take advantage of this opportunity and may miss potential time-savings. For example, there may be a situation in which three consecutive railroad cars in the stock train may be assigned to the same marshalling track. In this example, the speed of the hump push engine may be increased without sacrificing operations, as a distance between the railroad cars may be minimized because the railroad cars are assigned to the same marshalling track. Increase the speed may provide a savings in time that, even if small, may aggregate with other time-savings resulting in a significant time-savings. However, as the speed of the hump push engine is determined by the operator, if the operator does not increase the speed, as the operator may not know what the optimal higher speed may be, the speed of the hump push engine may not be increased.

Furthermore, as noted above, the operator may not be able to determine what the optimal control speed for the remote-controlled engine may be at all times during operation. This is because the optimal control speed may be based on many factors, which may include factors specific to they hump yard but may also include dynamic factors that may not be known before and but may become known during operation.

The deficiency in current implementations of remote-controlled vehicles is not exclusive to hump yard systems. Indeed, any remote-controlled vehicle system may be limited in its functionality as noted above because an operator manually setting the control speed may not be able to dynamically determine an optimal control speed.

BRIEF SUMMARY

The present disclosure achieves technical advantages as systems, methods, and computer-readable storage media that provide functionality for selection of a control speed for a remote-controlled vehicle based on rulesets applied to control nodes within a viewing window. The present disclosure provides for a system integrated into a practical application with meaningful limitations as a system with functionality for controlling the selection of a control speed for a remote-controlled vehicle and for triggering the remote-controlled vehicle to adjust its speed to the control speed. In embodiments, selecting the control speed for the remote-controlled vehicle may include generating a control speed plan that may include a speed profile to be followed by the remote-controlled vehicle. In embodiments, the control speed plan may be generated based on limitations associated with each control node within a current viewing window. In embodiments, as the viewing window expands or changes (e.g., as additional control nodes are included in the current viewing window), the control speed plan may be adjusted to include limitations associated with the additional control nodes within the expanded or modified viewing window. In this manner, the present disclosure provides a system with functionality that allows the system to adapt to changing conditions.

The present disclosure solves the technological problem of a lack of functionality in current systems to dynamically determine and select a control speed for a remote-controlled vehicle. For example, in current systems, the speed of a remote-controlled speed may be set by an operator, but may not be responsive to changing conditions, as the operator must manually request a different control speed if desired. A system implemented in accordance with the present disclosure may be flexible and responsive to the presence of additional information, which may allow for a system that is more robust than existing systems, which are unable to adapt to changing conditions. Furthermore, a system implemented in accordance with the present disclosure may be enabled to generate a control speed plan for a remote-controlled vehicle that is more accurate, as it may be based on current (or visible) operating conditions rather than on operating conditions that may not be visible currently. As the visibility of the operating conditions increases, the system may adapt to consider the newly visible operating conditions to generate the control speed plan for the remote-controlled vehicle.

The technological solutions provided herein, and missing from conventional systems, are more than a mere application of a manual process to a computerized environment, but rather include functionality to implement a technical process to replace or supplement current manual solutions for control speed planning of remote-controlled vehicles. In doing so, the present disclosure goes well beyond a mere application the manual process to a computer. For example, the present disclosure provides solutions that include implementing functionality to determine a current viewing window including one or more control nodes, each of which may be associated with a ruleset, to determine one or more operating conditions based on the application of the rulesets to each of the one or more control nodes within the current viewing window, to generate a control speed plan based on the one or more operating conditions of the one or more control nodes within the current viewing window, and to output the control speed plan to a speed controller of the vehicle. Accordingly, the claims herein necessarily provide a technological solution that overcomes a technological problem. Accordingly, the present disclosure provides the technological benefit of implementing functionality to current remote-control systems for selection of a control speed for remote-controlled vehicles.

It is an object of the disclosure to provide a system for determining a control speed for a vehicle. It is a further object of the disclosure to provide a method of determining a control speed for a vehicle, and a computer-based tool for determining a control speed for a vehicle. These and other objects are provided by the present disclosure, including at least the following embodiments.

In one particular embodiment, a method of determining a control speed for a vehicle is provided. The method includes determining a current viewing window representing a range of visibility of at least a portion of current operating conditions, the current viewing window including one or more control nodes. In embodiments, each control node of the one or more control nodes represents a control point associated with a ruleset. The method also includes determining one or more operating conditions for each control node of the one or more control nodes within the current viewing window based on the ruleset associated with each respective control node and generating a control speed plan for the current viewing window based on the one or more operating conditions for each control node of the one or more control nodes within the current viewing window. In embodiments, the control speed plan for the current viewing window may include an optimal control speed for the vehicle at each control node of the one or more control nodes within the current viewing window based on the one or more operating conditions determined for each control node of the one or more control nodes within the current viewing window and a speed profile indicating an acceleration or deceleration curve to be followed through each of the optimal control speeds in the control speed plan when executing the control speed plan. The method further includes outputting the control speed plan for the current viewing window to a speed controller of the vehicle configured to adjust the speed of the vehicle at each control node of the one or more control nodes within the current viewing window according to a respective optimal control speed for the vehicle at each control node of the one or more control nodes within the current viewing window.

In another embodiment, a system for determining a control speed for a vehicle is provided. The system comprises at least one processor and a memory operably coupled to the at least one processor and storing processor-readable code that, when executed by the at least one processor, is configured to perform operations. The operations include determining a current viewing window representing a range of visibility of at least a portion of current operating conditions, the current viewing window including one or more control nodes. In embodiments, each control node of the one or more control nodes represents a control point associated with a ruleset. The operations also include determining one or more operating conditions for each control node of the one or more control nodes within the current viewing window based on the ruleset associated with each respective control node and generating a control speed plan for the current viewing window based on the one or more operating conditions for each control node of the one or more control nodes within the current viewing window. In embodiments, the control speed plan for the current viewing window may include an optimal control speed for the vehicle at each control node of the one or more control nodes within the current viewing window based on the one or more operating conditions determined for each control node of the one or more control nodes within the current viewing window and a speed profile indicating an acceleration or deceleration curve to be followed through each of the optimal control speeds in the control speed plan when executing the control speed plan. The operations further include outputting the control speed plan for the current viewing window to a speed controller of the vehicle configured to adjust the speed of the vehicle at each control node of the one or more control nodes within the current viewing window according to a respective optimal control speed for the vehicle at each control node of the one or more control nodes within the current viewing window.

In yet another embodiment, a computer-based tool for determining a control speed for a vehicle is provided. The computer-based tool including non-transitory computer readable media having stored thereon computer code which, when executed by a processor, causes a computing device to perform operations. The operations include determining a current viewing window representing a range of visibility of at least a portion of current operating conditions, the current viewing window including one or more control nodes. In embodiments, each control node of the one or more control nodes represents a control point associated with a ruleset. The operations also include determining one or more operating conditions for each control node of the one or more control nodes within the current viewing window based on the ruleset associated with each respective control node and generating a control speed plan for the current viewing window based on the one or more operating conditions for each control node of the one or more control nodes within the current viewing window. In embodiments, the control speed plan for the current viewing window may include an optimal control speed for the vehicle at each control node of the one or more control nodes within the current viewing window based on the one or more operating conditions determined for each control node of the one or more control nodes within the current viewing window and a speed profile indicating an acceleration or deceleration curve to be followed through each of the optimal control speeds in the control speed plan when executing the control speed plan. The operations further include outputting the control speed plan for the current viewing window to a speed controller of the vehicle configured to adjust the speed of the vehicle at each control node of the one or more control nodes within the current viewing window according to a respective optimal control speed for the vehicle at each control node of the one or more control nodes within the current viewing window.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2 shows an example of a ruleset associated with a control node in accordance with embodiments of the present disclosure;

Figure 1:
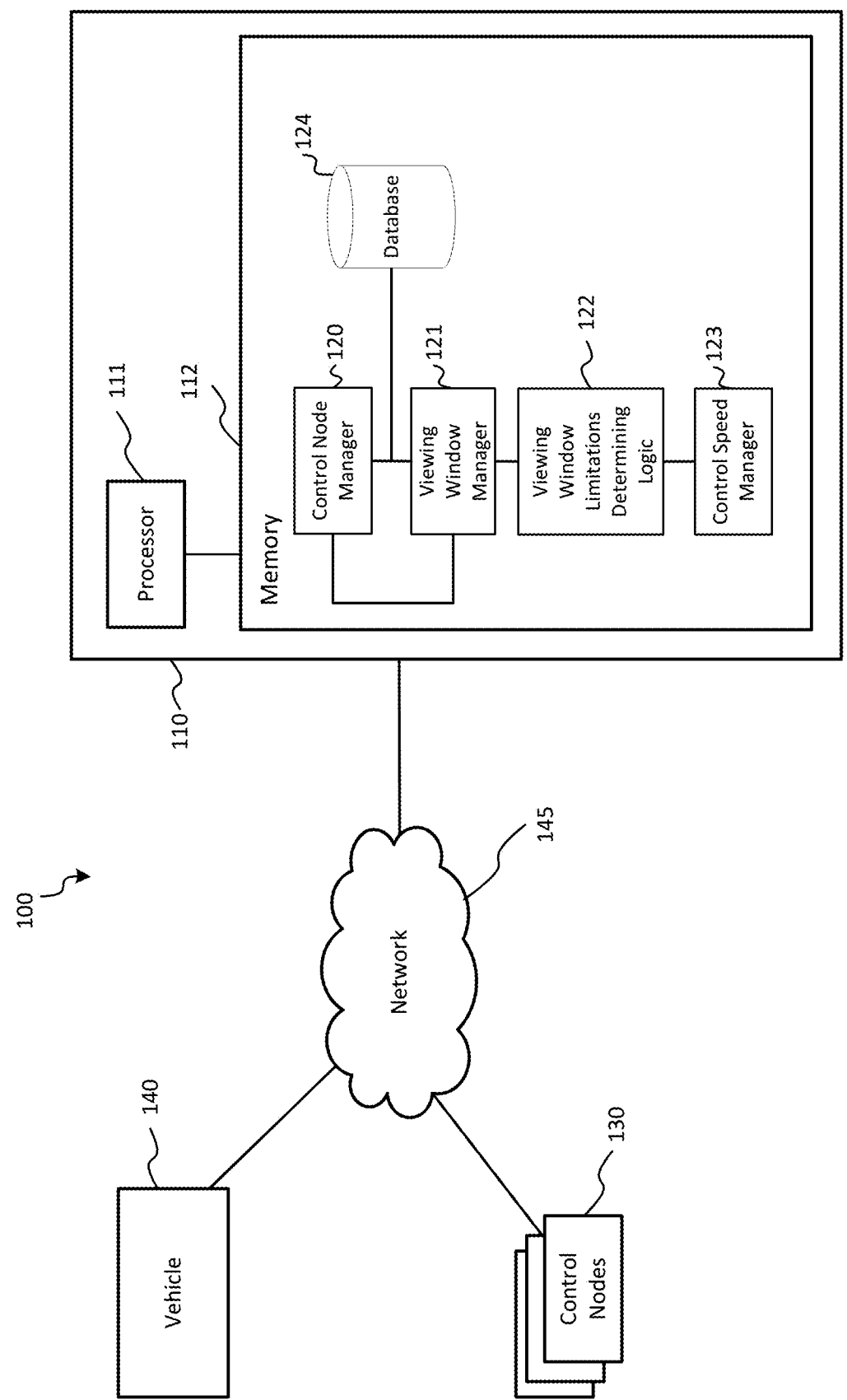
FIG. 1 is a block diagram of an exemplary system configured with capabilities and functionality for selection of a control speed for a remote-controlled vehicle based on rulesets applied to control nodes within a viewing window in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for selection of a control speed for a remote-controlled vehicle based on rulesets applied to control nodes within a viewing window. In particular embodiments, a current viewing window that may include one or more control nodes may be determined. The current viewing window may represent a range of visibility of the current operating conditions. For example, each of the one or more control nodes may represent a control point (e.g., an event, an object, etc.) having a ruleset associated therewith. In embodiments, the ruleset for a control node may define operating conditions (e.g., factors, limitations, etc.) associated with the control point represented by the control node. For example, a ruleset for a control node may define operating limitations (e.g., speed limitations, orientation limitations, etc.) that are to be observed at the control point represented by the control node. In embodiments, rulesets may be applied to an associated control node, which may provide a set of operating conditions for the control node. In this manner, the current viewing window may represent a visibility of the current operating conditions based on the operating conditions obtained based on the rulesets associated with the one or more nodes within the current viewing window. In embodiments, a control speed plan for the current viewing window may be generated based on the one or more operating conditions for each control node of the one or more control nodes within the current viewing window. The control speed plan may include an optimal control speed at each control node within the current viewing window and a speed profile indicating an acceleration or deceleration curve to be followed through each of the optimal control speeds in the control speed plan when executing the control speed plan. In embodiments, the control speed plan for the current viewing window may be output to a speed controller of a vehicle configured to adjust the speed of the vehicle at each control node according to the control speed plan for the current viewing window.

In embodiments, the current viewing window may increase or expand to include additional control nodes, and each of these additional control nodes may be associated with a respective ruleset. In these embodiments, the rulesets may be applied to the additional control nodes to determine operating parameters associated with the additional control nodes. In embodiments, the control speed plan for the current viewing window may be modified for the expanded viewing window based on the additional operating parameters for the additional control nodes within the expanded viewing window. In some cases, optimal control speed for one or more control nodes in the current viewing window specified in the previous control speed plan may change in the modified control speed plan based on the additional operating parameters for the additional control nodes within the expanded viewing window.

FIG. 1 is a block diagram of an exemplary system 100 configured with capabilities and functionality for selection of a control speed for a remote-controlled vehicle based on rulesets applied to control nodes within a viewing window in accordance with embodiments of the present disclosure. As shown in FIG. 1, system 100 may include server 110, control nodes 130, vehicle 140, and network 145. These components, and their individual components, may cooperatively operate to provide functionality in accordance with the discussion herein. For example, in operation according to embodiments, each of control nodes 130 may be associated with a ruleset defining one or more operating parameters for each of control nodes 130. Functionality of server 110 may operate to determine a current viewing window that may include one or more real or virtual nodes of control nodes 130. Functionality of server 110 may operate to determine operating parameters for each of the one or more control nodes of control nodes 130 by applying the respective ruleset to each of the one or more control nodes of control nodes 130. Functionality of server 110 may operate to generate a speed plan based on the operating parameters for each of the one or more control nodes of control nodes 130 that may include an optimal speed for vehicle 140 at each of the one or more control nodes of control nodes 130 and a path to achieve the expectations of the control node (e.g., an acceleration or deceleration curve) between each pair of control nodes within the current viewing window.

It is noted that the present discussion focuses on a particular application of control speed planning that involves generating a control speed plan for a remote-controlled vehicle (e.g., a vehicle engine such as a locomotive engine, a hump engine, etc.) in an intermodal facility (e.g., a train yard, a hump yard, etc.). However, it should be appreciated that the techniques disclosed herein may also be applicable to other applications of control speed planning for remote-controlled vehicles. For example, the techniques disclosed herein may also be applicable for determining optimal speeds for remote-controlled ground vehicles, such as for determining optimal control speeds for traversing a curve or other road conditions. As such, the discussion herein with respect to control speed planning for remote-controlled vehicles in a train yard should not be construed as limiting in any way.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 145.

Vehicle 140 may include a remote-controlled vehicle. A remote-controlled vehicle may include a device, machine, equipment, or engine configured with remote-control functionality. The remote-control functionality of vehicle 140 may allow remote control of at least a portion of the functionality of vehicle 140. For example, in embodiments, at least a portion of the functionality of vehicle 140 may be remotely controlled by the functionality of server 110. In this example, server 110 may be located in a location separate from the location in which vehicle 140 is to operate. The remote location of server 110 may be near or far from the location in which vehicle 140 is to operate. In some embodiments, server 110 may actually be onboard vehicle 140, and in this case, the functionality of server 110 to remotely-control the at least a portion of vehicle 140 may actually be integrated within vehicle 140. In these embodiments, the remote-control functionality of vehicle 140 may be more accurately referred to as autonomous control functionality, as it may refer to controlling functionality of vehicle 140 via the functionality of server 110 rather than via an operator remotely.

In embodiments, the remotely controlled functionality of an object or vehicle 140 may include the speed at which an object or vehicle 140 is to travel, the direction at which an object or vehicle 140 is to travel, the angle at which an object or vehicle 140 is to travel, the orientation at which an object or vehicle 140 is to travel, etc. For example, in some embodiments, vehicle 140 may include a remote-controlled engine operating in a train yard (e.g., a hump yard), operating with or without a payload. In this example, the remote-control functionality of vehicle 140 may include controlling the speed at which the remote-controlled engine travels. For example, vehicle 140 may include a hump push engine and the remote-control functionality of vehicle 140 may include controlling the speed at which the hump push engine pushes the stock train through the hump. In another example, vehicle 140 may include a hump pull engine and the remote-control functionality of vehicle 140 may include controlling the speed at which the hump pull engine pulls assembled trains from the marshalling tracks.

It is noted that, in the hump engine example, the speed of the hump engine is remotely controlled in the sense that a control speed (e.g., a speed at which the hump engine is to travel (e.g., pushing or pulling a train)) may be requested (e.g., via a control speed command) remotely by server 110. However, in some embodiments, the hump engine may include functionality to execute the control speed command or request and to operate to travel at the requested control speed. For example, during operation, server 110 may send a control speed command to vehicle 140 requesting a first control speed. In embodiments, vehicle 140 may leverage its functionality to control the speed of vehicle 140 to match the first control speed in the control speed command to vehicle 140. In some embodiments, the control speed requested of vehicle 140 may be part of a control speed plan generated for a viewing window, which may a set of control speed commands requesting an optimal (or target) control speed at each of a set of control nodes and including an acceleration or deceleration curve between each pair of control nodes within the viewing window as described in more detail below.

Control nodes 130 may include one or more control nodes each representing a control point. In embodiments, control nodes 130 may be structured as a series or sequence of control nodes or may be a group of control nodes without a sequence. For example, control nodes 130 may represent the railroad cars in a stock train being pushed through a hump by a hump push engine. In this example, control nodes 130 may be in a sequence, which may represent the sequence in which the railroad cars in the stock train are pushed through the hump and may have their own control profile.

In embodiments, a control point may be an event, an object (e.g., a vehicle, an engine, an asset, etc.), a characteristic, a factor, etc., that may have relevance or impact to the control speed of vehicle 140. For example, in some embodiments, such as where vehicle 140 may include a hump push engine, control nodes 130 may include the railroad cars in the stock train that are to be marshalled using the hump yard. In these embodiments, each of control nodes 130 may represent one of the railroad cars in the stock train. In some embodiments, such as where vehicle 140 may include a hump pull engine, control nodes 130 may include the railroad cars in the assembled train that is to be pulled from the marshalling track by the hump pull engine. In these embodiments, each of control nodes 130 may represent one of the railroad cars in the assembled train that is to be pulled from the marshalling track. In yet other embodiments, such as where vehicle 140 may represent a vehicle traversing a curve, control nodes 130 may include factors or portions of the rail curve being traversed. For example, control nodes 130 may include a control node that may represent the grade of the curve, another control node that may represent a speed limit of the curve, another control node may represent an environmental condition (e.g., weather, time of the day, etc.), etc.

In embodiments, each control node of control nodes 130 may be associated with a ruleset. A ruleset of a control node may specify a set of rules, each of which may be related to an operating condition under which vehicle 140 is to operate and may define the operating condition based on operational factors. For example, in some embodiments, the ruleset of each of control nodes 130 may define limitations associated the respective control node. The limitations defined by a ruleset may include speed limitations associated with the respective node associated with the ruleset.

In embodiments, the ruleset associated with a control node may include rules that may be specified by operators, users, subject matter experts, regulations, specifications, etc. In embodiments, the ruleset for a control node may be modified to remove existing rules from the ruleset or to include additional rules. In some embodiments, the rules in the ruleset of a control node may be defined by a rule structure, algorithm, or profile such as rule tables, equations, or other suitable parameter.

FIG. 2 shows an example of a ruleset 210 associated with a control node in accordance with embodiments of the present disclosure. As shown in FIG. 2, ruleset 210 may be defined a set of rule tables 220-224 and 230, which may be stored in memory and can be implemented by a server or processor. In embodiments, each of the rule tables of ruleset 210 may be related to an operating condition of the control node and may define a limitation of the operating condition based on operational factors. In embodiments, a control node may have more than one limitation associated with the control node (e.g., a limitation for each rule in the ruleset). In these embodiments, all the limitations of a control node may be considered when determining an optimal control speed for the control node, although a single control speed may be determined for the control node based on the limitations. For example, ruleset 210 exemplified in FIG. 2 may apply to operations related to a hump yard and may relate to determining control speeds for a hump engine. In this example, ruleset 210 may be associated with a control node which may represent a railroad car in a stock train being marshalled through the hump yard. In this example, each of the rule tables of ruleset 210 may be related to an operating condition of the hump yard and may define limitations of the operating condition based on operational factors. For example, rule table 220 may be related to a cut speed of the associated railroad car (e.g., the associated control node). In embodiments, the cut speed of a railroad car may refer to the crest speed (e.g., the speed at the crest or top of the hump) to which the railroad car is limited and cutting a railroad car from the stock train may refer to separating the railroad car from the stock train using the hump. In embodiments, a group of railroad cars may be cut from the stock train when the group of railroad cars may be assigned to the same marshalling track. In this case, rule table 220 may specify a crest speed limitation of the railroad car based on the number of railroad cars that are to be "cut," including the railroad car associated with ruleset 210, from the stock train. For example, rule table 220 specifies that, when the group to be cut from the stock train includes only one railroad car (e.g., the railroad car associated with ruleset 210), the crest speed of the group of one is limited to 2 miles per hour (mph). On the other hand, when a group of four railroad cars, including the railroad car associated with ruleset 210, are to be cut from the stock train (e.g., the four cars are assigned to the same marshalling track), the crest speed of the railroad car is limited to 3.2 mph. In this manner, rule table 220 may be used to determine a cut speed limitation for the railroad car associated with ruleset 210 based on the on the number of cars to be cut from the stock train. As will be appreciated from rule table 220, a higher number of railroad cars in a group to be cut from the stock train means that a higher crest speed may be used, as the distance between the railroad cars in the group of railroad cars can be small or zero because the group is assigned to the same marshalling track. On the other hand, a lower number of railroad cars in a group to be cut from the stock train means that a lower crest speed may be used, as a higher distance may be desired between the group of railroad cars and the next group to allow for the switch to be reset to route the next group to the appropriate marshalling track.

Rule table 222 may be related to a destination track speed of the railroad car associated with ruleset 210. In embodiments, the destination track of a railroad car may refer to the marshalling track to which the railroad car is assigned. In this example, rule table 222 may specify crest speed limits for the railroad car associated with ruleset 210 based on the marshalling track to which the railroad car is assigned. In some embodiments, rule table 222 may limit the crest speed of the railroad car associated with ruleset 210 further based on the marshalling track to which the next railroad car (e.g., the next railroad car in the stock train) is assigned. For example, the railroad car associated with ruleset 210 may be assigned to the neighboring track number 2021 and the next car may be assigned to either track number 2022 or track number 2020. In this case, the crest speed of the railroad car associated with ruleset 210 may be limited to 1.9 mph. On the other hand, when the railroad car associated with ruleset 210 is assigned to the same track to which the next car is assigned, rule table 222 specifies a crest speed. It is noted that the unlimited crest speed specified for this example may not be a true unlimited speed, but rather an indication that a limitation of the crest speed may not need to be specified based on the destination track of the railroad track. In these cases, the crest speed may still be limited by another one of the rules in the ruleset of the railroad car.

Rule table 224 may be related to car characteristics of the railroad car associated with ruleset 210. For example, rule table 224 may specify crest speed limits for the railroad car associated with ruleset 210 based on the type of car, as well as specifying further applicable operating conditions. In a particular case, for example where the railroad car associated with ruleset 210 is a boxcars pin lifter railroad car, rule table 224 may specify a crest speed limit of 2 mph for the railroad car associated with ruleset 210. On the other hand, where the railroad car associated with ruleset 210 may be a short single car, rule table 224 may specify a crest speed limit of 1.9 mph for the railroad car associated with ruleset 210. It is noted that, in the case of the railroad car associated with ruleset 210 being a short single car, rule table 224 may specify a further applicable operating condition when the maximum size of the car within the stock train to be cut is 45 feet or less.

In some embodiments, ruleset 210 may include rules that may be applicable globally to the hump yard, rather than specifically to the railroad car associated with ruleset 210.

For example, rule table 230 may be a global rules table, defining speed limitations that apply globally to all railroad cars or hump engines operating in the hump yard. In this example, rule table 230 may specify a maximum hump speed of 5 mph. In this case, all railroad cars in the stock train may be limited to this 5-mph hump speed limit.

It is noted that the discussion herein with respect to four rules for a ruleset of a control node is for illustrative purposes and not by way of limitation. Indeed, in some embodiments, additional (or less) rules (e.g., more rule tables) may be defined for or included in a ruleset for a control node. As such, the discussion herein with respect to four rules for a ruleset of a control node should not be construed as limiting in any way.

With reference back to FIG. 1, server 110, vehicle 140, and control nodes 130 may be communicatively coupled via network 145. Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc.

Server 110 may be configured to facilitate operations for selection of a control speed for a remote-controlled vehicle based on rulesets applied to control nodes within a viewing window in accordance with embodiments of the present disclosure. In embodiments, functionality of server 110 to facilitate selection of a control speed for a remote-controlled vehicle based on rulesets applied to control nodes within a viewing window may be provided by the cooperative operation of the various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

As shown in FIG. 1, server 110 includes processor 111, memory 112, database 124, control node manager 120, viewing window manager 121, viewing window limitations determining logic, and control speed manager 123. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 124 for storing various information related to operations of system 100. For example, database 124 may store rulesets, rule tables, information on control nodes, configuration information to be used for configuring system 100, etc. In embodiments, database 124 may store characteristics of various and different engines, such as acceleration and/or deceleration profiles of the various engines. The acceleration and/or deceleration profiles may specify the acceleration and/or deceleration curves of the various engines (e.g., how fast an engine accelerates and/or how fast an engine decelerates).

Database 124 is illustrated as integrated into memory 112, but in some embodiments, database 124 may be provided as a separate storage module or may be provided as a cloud-based storage module. Additionally, or alternatively, database 124 may be a single database, or may be a distributed database implemented over a plurality of database modules.

Figure 3A:
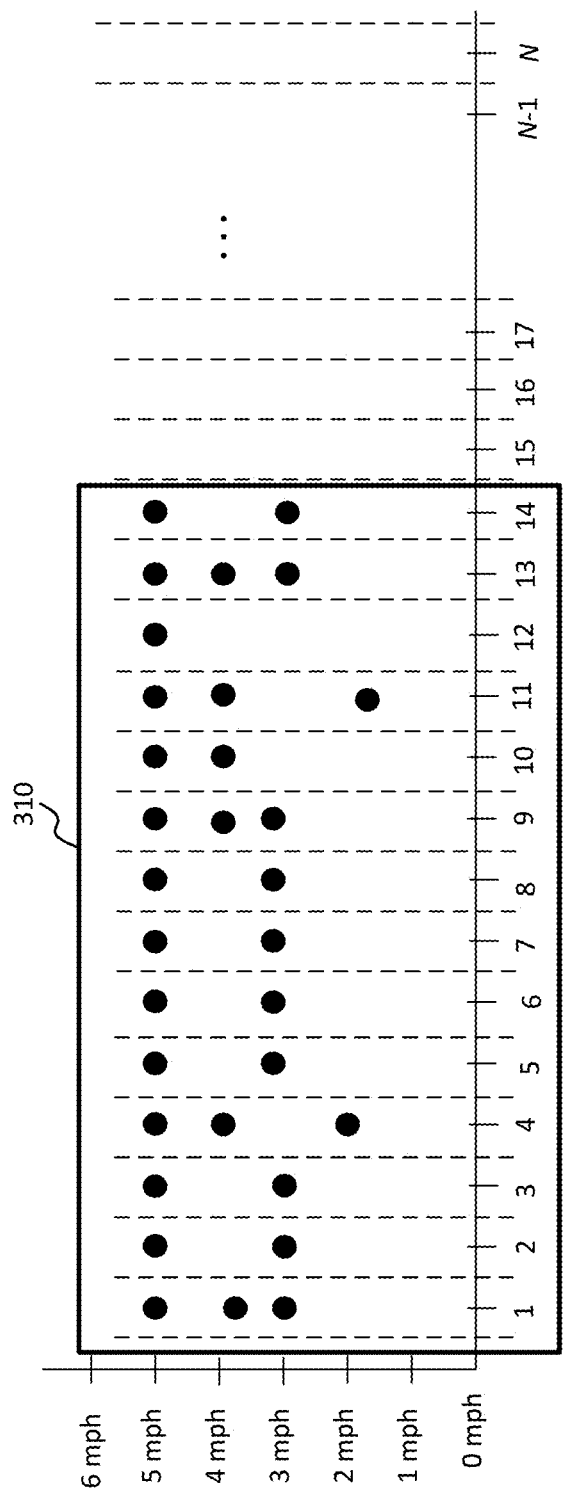
FIG. 3A is a diagram illustrating an example of a viewing window including control nodes in accordance with embodiments of the present disclosure.

Control node manager 120 may be configured to manage information and/or configuration related to control nodes 130. For example, in embodiments, control node manager 120 may be configured to validate each of control nodes 130. In embodiments, validating a control node of control nodes 134 may include determining whether the control node is in operation, activated, initiated, loaded, installed, or otherwise present during operation of system 100 to select a control speed for vehicle 140. For example, FIG. 3A illustrates an example of control nodes 1-N. In this example, control node manager 120 may operate to validate each of the control nodes 1-N. In this example, validating each of the control nodes 1-N may include determining whether the control nodes are activated, initiated, loaded, installed, or otherwise present during operation. For example, as shown in FIG. 3A, control nodes 1-14 may be validated while control nodes 15-N, at least, may be unvalidated. To further illustrate, in hump yard operations, and in particular in operations to select a control speed of a hump push engine, control nodes 130 may include the railroad cars assigned to the stock train to be marshalled through the hump. In this example, the stock train may be assigned a number of railroad cars in a particular sequence. The railroad cars may also be assigned to various marshalling tracks and in this case the railroad cars are to be marshalled to their assigned marshalling track through the hump. In this case, control nodes 1-N may represent the railroad cars assigned to the stock train to be marshalled through the hump. In embodiments, control node manager 120 may operate to validate each of the railroad cars assigned to the stock train by verifying whether each of the railroad cars is present in the stock train and/or whether the railroad tracks are present in their assigned sequence. In embodiments, control node manager 120 may determine that a railroad car is present by detecting the railroad car in the stock car (e.g., by use of a sensor such as a camera, video camera, a radio frequency (RF) detector, and RF identification (RFID) sensor, etc.) or by receiving a confirmation from an operator that the railroad car is present in the assigned stock train. For example, as shown in FIG. 3A, railroad cars 1-14 may be validated as present in the stock train, but railroad cars 15-N, at least, have not been validated as present.

With reference back to FIG. 1, viewing window manager 121 may be configured to determine a current viewing window. In embodiments, the current viewing window may represent a window or range of visibility of the current operating conditions, which may provide an insight into limitations related to a control speed to be selected for vehicle 140. In embodiments, visibility beyond the current viewing window may not be present or may be unreliable. For example, in embodiments, viewing window manager 121 may determine the current viewing window based on the control nodes of control nodes 130 that have been validated. In this manner, the current viewing window may include control nodes that are known to be valid. Control nodes whose validity status is unknown, or that are known to be invalid, may not be part of the current viewing window, as the unvalidated control nodes offer no further visibility of operating conditions. As the control nodes represent control points that may have relevance or impact to the control speed of vehicle 140, the functionality of viewing window manager 121 to determine the current viewing window allows system 100 to make determinations related to the optimal control speed of vehicle 140 based on the valid visibility of valid operating conditions rather than operating conditions that are not known to be valid, which may result in a more accurate and efficient determination of the optimal control speed for vehicle 140 at each of the control nodes. For example, following the hump yard example discussed above with respect to FIG. 3A, railroad cars 1-14 may be validated. In this case, viewing window manager 121 may determine current viewing window 310 to include railroad cars 1-14. In this case, viewing window manager 121 may not include unvalidated railroad cars 15-N in current viewing window 310. In this manner, determinations as to the optimal control speed for the hump push engines pushing the stock train through the hump may be made on the basis of speed limitations (e.g., based on respective rulesets) associated with railroad cars that are known to the present in the stock car, rather than on the basis of railroad cars that are not known to be present.

Figure 4A:
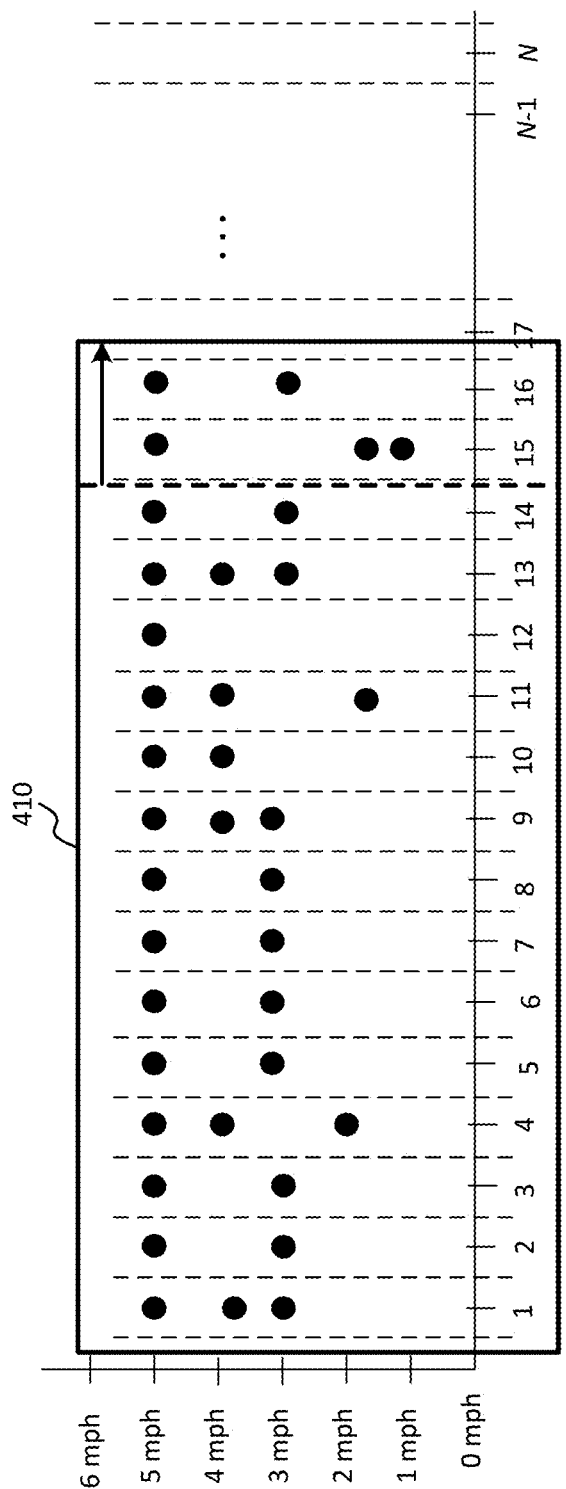
FIG. 4A is a diagram illustrating an example of an expanded viewing window including the addition of control nodes in accordance with embodiments of the present disclosure.

In embodiments, viewing window manager 121 may be configured to modify the current viewing window based on changes on the validated control nodes. For example, viewing window manager 121 may be configured to increase or expand the current viewing window to include additional control nodes upon a determination that the additional control nodes have been validated. As shown in FIG. 4A, which follows the illustration of the example described above with respect to FIG. 3A, control nodes 15 and 16 may be validated at a subsequent point in time after viewing window 310 was generated. In this case, viewing window manager 121 may expand viewing window 310 into expanded viewing window 410 to include newly validated control nodes 15 and 16. To further illustrate following the hump yard operation example above, control nodes 15 and 16 may represent railroad cars 15 and 16 of the stock train to be marshalled through the hump. In this case, viewing window manager 121 may determine to expand current viewing window 310 into expanded viewing window 410 to include newly validated railroad cars 15 and 16. In this case, viewing window manager 121 may not include unvalidated railroad cars 17-N in expanded viewing window 410. In this manner, viewing window manager 121 may provide functionality to flexibly and dynamically adjust the viewing window based on, and in response to, changing conditions and provides a robust mechanism for determining control speeds for remote-controlled vehicles that is accurate and configured to adapt to changing conditions.

With reference back to FIG. 1, viewing window limitations determining logic 122 may be configured to determine one or more operating conditions for each of the control nodes within the current viewing window. In embodiments, viewing window limitations determining logic 122 may operate to determine one or more operating conditions for each of the control nodes within the current viewing window by applying the respective ruleset associated with each control node within the current viewing window to each control node within the current viewing window. As noted above, a ruleset of a control node may include a set of rules, each of which may be related to an operating condition and may define the operating condition based on operational factors for the control node. Viewing window limitations determining logic 122 may apply the ruleset of each control node within the current viewing window to the respective control node to determine one or more operating conditions for each control node, as discussed above in detail with respect to FIG. 2. In this manner, viewing window limitations determining logic 122 may determine the operating conditions under which vehicle 140 may operate during the current viewing window. This insight into the operating conditions under which vehicle 140 may operate during the current viewing window may be leveraged by system 100 to determine optimal control speeds for vehicle 140 at each control node within the current viewing window. In embodiments, the end of a window can arise in the absence of feedback or the end of cars. In such situations, the next node can be a stop or 0-mph request. If no feedback is received from field devices, it is permissible for the rules to administer the desired handling as show for example in example 230. A rule or a rule set can start or stop the window frame of reference.

Configuration of viewing window limitations determining logic 122 to determine the operating conditions of each control node within the current viewing window may be discussed with respect to the example illustrated in FIG. 3A, and more specifically with respect to the hump yard example described above. In particular, each of railroad cars 1-14 within current viewing window 310 may have a ruleset associated with the railroad car. Examples of a ruleset have been described above with respect to FIG. 2 and control nodes 130. As described above, the ruleset of a particular railroad car may include rules that may apply to different operating conditions and may be used to determine the operating conditions based on operational factors. For example, the ruleset of control nodes 1-14 may include a global rule (e.g., global rule table 230 in FIG. 2) that may define a maximum hump speed of 5 mph. As shown in FIG. 3A, each of railroad cars 1-14 may include a speed limitation of 5 mph. In the same example, the ruleset of a particular railroad car, such as railroad car 2, may include a cut speed rule (e.g., cut speed rule 220 in FIG. 2) that may define a crest speed limit based on the number of railroad cars in a cut group. In this example, node 2 may be part of a cut group of three, which may include railroad cars 1-3. In this case, railroad car 2 may also include a speed limitation of 3 mph. Incidentally, each of railroad cars 1-3 may include a speed limitation of 3 mph, as each of railroad cars 1-3 are member of a cut group of three and may include a cut speed rule in their respective rulesets.

In embodiments, viewing window limitations determining logic 122 may apply the respective ruleset to each of control nodes 1-14 to determine the limitations associated with each of control nodes 1-14. In the hump yard example, the limitations associated with each control node may include speed limitations for each of the railroad cars within current viewing window 310 (e.g., railroad cars 1-14). In embodiments, determinations as to the optimal control speed of vehicle 140 (e.g., the hump push engine in this example) at each of the railroad cars 1-14, which may include the optimal crest speed of the railroad car or the optimal speed that vehicle 140 is to travel to ensure that the railroad car is at the optimal speed at the crest of the hump, may be based on the speed limitations for each of the railroad cars within current viewing window 310.

In embodiments, viewing window limitations determining logic 122 may be configured to determine one or more operating conditions for each of the control nodes within a modified viewing window. For example, as discussed above with respect to FIG. 4A, the current viewing window may be increased or expanded to include additional control nodes upon a determination that the additional control nodes have been validated. For example, upon determination that control nodes 15 and 16 are validated, current window 310 may be expanded into expanded viewing window 410 to include newly validated control nodes 15 and 16. To further illustrate following the hump yard operation example above, control nodes 15 and 16 may represent railroad cars 15 and 16 of the stock train to be marshalled through the hump. In this case, current viewing window 310 may be expanded into expanded viewing window 410 to include newly validated railroad cars 15 and 16. In this case, viewing window limitations determining logic 122 may be configured to determine one or more speed limitations associated with railroad cars 15 and 16 based on application of the rulesets associated with the respective railroad car. For example, the rulesets associated with railroad cars 15 and 16 may include a global rule (e.g., global rule table 230 in FIG. 2) defining a maximum hump speed of 5 mph. In this case, viewing window limitations determining logic 122 may determine a 5 mph limitation for both railroad cars 15 and 16. In this example, the ruleset associated with railroad car 15 may include a rule defining a speed limitation of 1.2 mph. In this case, viewing window limitations determining logic 122 may determine a 1.2 mph limitation for railroad car 15, and railroad car 15 may include at least a 1.2 mph and a 5 mph limitation.

With reference back to FIG. 1, control speed manager 123 may be configured to generate a control speed plan for vehicle 140 based on the one or more operating conditions for each of the control nodes within the current viewing window. In embodiments, the control speed plan may be provided to a speed controller (not shown) of vehicle 140, and the speed controller of vehicle 140 may operate to control the speed of vehicle 140 according the control speed plan. In some embodiments, the control speed plan may be executed by control speed manager 123 and in these embodiments, control speed commands may be transmitted to vehicle 140 based on the control speed plan to ensure that the speed of vehicle 140 follows the control speed plan. In some embodiments, the control speed plan may be applicable to the current viewing window and may provide speed control information associated with control nodes within the current viewing window. In some embodiments, the control speed plan may exclude speed control information associated with control nodes outside of the current viewing window.

In embodiments, control speed manager 123 may be configured to determine, and include in the control speed plan, an optimal control speed for vehicle 140 at each control node of the control nodes within the current viewing window based on the one or more operating conditions determined for each control node within the current viewing window. In embodiments, executing the control speed plan may include controlling vehicle 140 such that, at each of the control nodes within the current viewing window, the speed of vehicle 140 is the optimal control speed determined for each respective control node.

In embodiments, determining the optimal control speed for a control node may be based on the most restrictive limitation associated with the control node. For example, with reference to the example illustrated in FIG. 3A, an optimal control speed for control node 4 may be based on the 2 mph limitation, as it is the most restrictive limitation for control node 4. In the same example, an optimal control speed for control node 5 may be based on the 3 mph limitation, as it is the most restrictive limitation for control node 5. In embodiments, determining the optimal control speed for a control node based on the most restrictive limitation associated with the control node may include setting the optimal control speed for the control node to the most restrictive speed limitation associated with the control node.

In some embodiments, determining the optimal control speed for a control node may be further based on the acceleration and/or deceleration capabilities of vehicle 140. In these embodiments, determining the optimal control speed for a control node may include setting an optimal control speed that ensures that the most restrictive speed limitation associated with the control node is not exceeded based on the based on the acceleration and/or deceleration capabilities of vehicle 140. For example, the acceleration/deceleration capabilities of vehicle 140 may prevent vehicle 140 from accelerating or decelerating from a control speed at a first node sufficiently to reach the optimal control speed at a second node. In this case, the optimal control speed at the first node may be set lower than the most restrictive speed limitation associated with the first control node to ensure that the second control speed is reached while not exceeding the most restrictive speed limitation associated with the first control node.

In embodiments, control speed manager 123 may be configured to generate, and include in the control speed plan, a speed profile indicating an acceleration or deceleration curve to be followed through each of the optimal control speeds in the control speed plan when executing the control speed plan. In embodiments, the speed profile of the control speed plan may be based on the acceleration and/or deceleration capabilities of vehicle 140. For example, the acceleration capabilities of vehicle 140 may specify or define the maximum acceleration that vehicle 140 may be able to achieve. The deceleration capabilities of vehicle 140 may specify or define the maximum deceleration that vehicle 140 may be able to achieve. In some embodiments, the acceleration and/or deceleration capabilities of vehicle 140 may be based on a type of control associated with vehicle 140, with the operational environment of vehicle 140, or with other operational factors. In embodiments, the type of controls may include a first control in which a curve, such as acceleration or deceleration curve, may have a normal slope (e.g., a normal control), a second control in which a curve, such as acceleration or deceleration curve, may have a higher slope than the normal slope of the first control (e.g., a safety control), and a third control in which a curve, such as acceleration or deceleration curve, may have a steeper slope than the slope of the second control (e.g., an emergency control).

In embodiments, generating the speed profile of the control speed plan may include determining an acceleration curve for the current viewing window based on the most restrictive limitation associated with each control node within the current viewing window, determining a deceleration curve for the current viewing window based on the most restrictive limitation associated with each control node within the current viewing window, and combining the acceleration curve and the deceleration curve into the speed profile to be included in the control speed plan. For example, FIG. 3B is a diagram illustrating an example of an acceleration curve generated for a current viewing window based on the most restrictive limitation associated with each control node within the current viewing window in accordance with embodiments of the present disclosure, FIG. 3C is a diagram illustrating an example of a deceleration curve generated for a current viewing window based on the most restrictive limitation associated with each control node within the current viewing window in accordance with embodiments of the present disclosure, and FIG. 3D is a diagram illustrating an example of an control speed plan generated for a current viewing window in accordance with embodiments of the present disclosure.

Figure 3B:
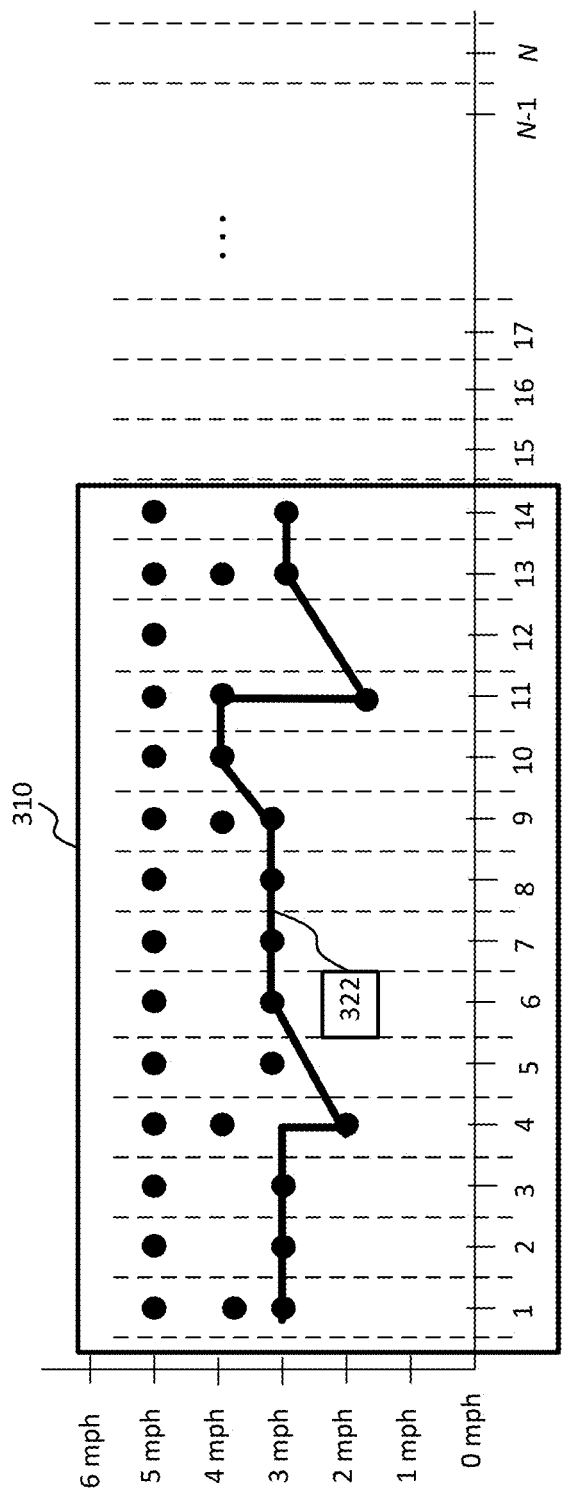
FIG. 3B is a diagram illustrating an example of an acceleration curve generated for a current viewing window based on the most restrictive limitation associated with each control node within the current viewing window in accordance with embodiments of the present disclosure.

As illustrated in FIG. 3B, generating acceleration curve 322 may include the assumption of a maximum deceleration for vehicle 140 and applying the acceleration capabilities of vehicle 140 to ensure that, at each control node within current viewing window 310, the most restrictive speed limitation is reached. For example, starting at control node 1 through control node 3, the most restrictive speed limitation is a 3 mph speed limitation. In this case, acceleration curve 322 may include the 3 mph speed through control nodes 1-3. At control node 4, the most restrictive speed limitation is a 2 mph limitation. In this case, acceleration curve 322 may include decelerating to 2 mph at control node 4. As the most restrictive speed limitation at control nodes 5-9 is a 3 mph speed limitation, acceleration curve 322 begins accelerating at control node 4, in accordance with the acceleration capabilities of vehicle 140 and reaches 3 mph at control node 6. In this case, although the most restrictive speed limitation at control node 5 is a 3 mph limitation, due to the configured or assumed acceleration capabilities of vehicle 140, the 3 mph speed may not be reached at control node 5 and instead, the optimal control speed at control node 5 is lower than the 3 mph limitation. At control node 9, acceleration curve 322 begins accelerating toward 4 mph, which is the most restrictive speed limitation at control node 10. At control node 11, acceleration curve 322 decelerates to 1.6 mph, which is the most restrictive speed limitation at control node 11. At control node 11, acceleration curve 322 begins accelerating toward 3 mph, which is the most restrictive speed limitation at control nodes 13 and 14. As current window does not extend beyond control node 14, the acceleration curve 322 generated by control speed manager 123 may be limited to the range including control nodes 1-14 and no more. In this manner, it is noted that the acceleration curve 322 generated by control speed manager 123 based on the limitations associated with control nodes 1-14 is confined to the current viewing window 310.

Figure 3C:
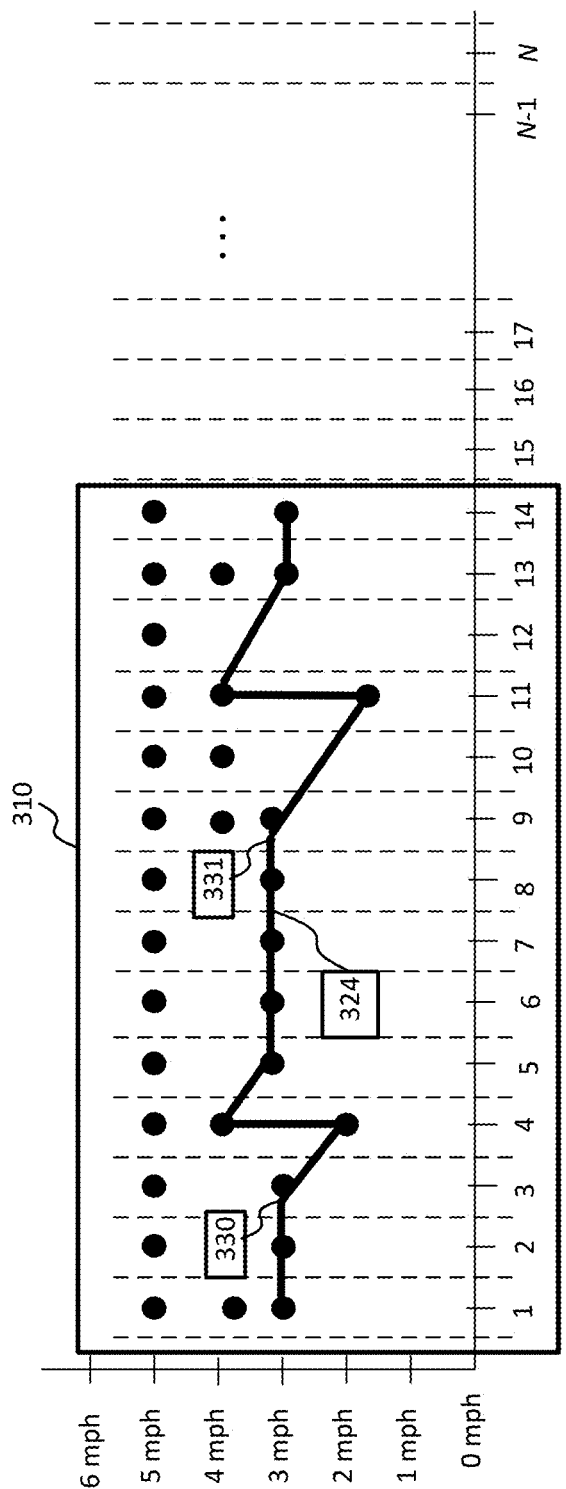
FIG. 3C is a diagram illustrating an example of a deceleration curve generated for a current viewing window based on the most restrictive limitation associated with each control node within the current viewing window in accordance with embodiments of the present disclosure.
Figure 3D:
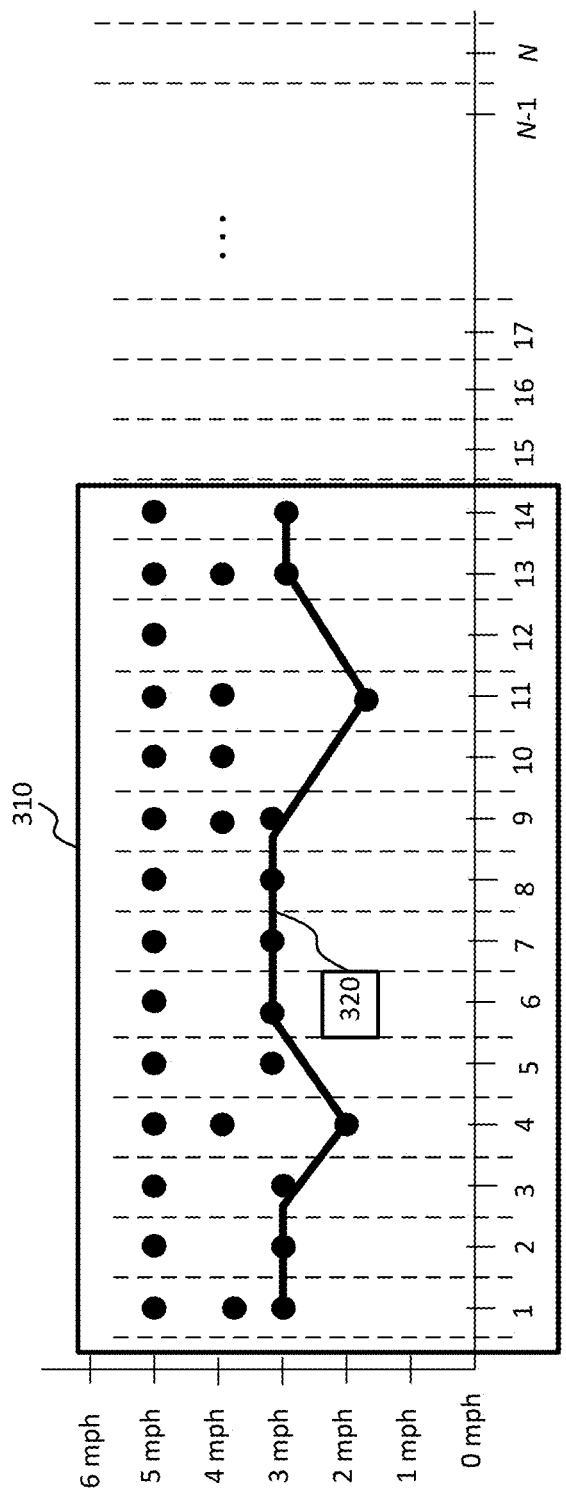
FIG. 3D is a diagram illustrating an example of a control speed plan generated for a current viewing window in accordance with embodiments of the present disclosure.

As illustrated in FIG. 3C, generating deceleration curve 324 may include assuming a perfect acceleration for vehicle 140 and applying the deceleration capabilities of vehicle 140 to ensure that, at each control node within current viewing window 310, the most restrictive speed limitation is reached. For example, starting at control node 1 through control node 3, the most restrictive speed limitation for these control nodes is a 3 mph speed limitation. However, at control node 4, the most restrictive speed limitation for these control nodes is a 2 mph speed limitation. Based on the deceleration capabilities of vehicle 140, control speed manager 123 may determine that, in order to reach the 2 mph speed limitation at control node 4, deceleration curve 324 begins decelerating, in accordance with the deceleration capabilities of vehicle 140, at point 330, which is a point before control node 3. In this case, deceleration curve 324 may begin decelerating at point 330 in order to reach the 2 mph speed limitation at control node 4. In this case, although the most restrictive speed limitation at control node 3 is a 3 mph limitation, due to the deceleration capabilities of vehicle 140, the 3 mph speed may not be reached at control node 3 and instead, the optimal control speed at control node 3 is lower than the 3 mph limitation. At control node 4, after reaching the 2 mph limitation, deceleration curve 324 may accelerate to 4 mph, which may be maximum speed that allows deceleration curve 324 to reach the most restrictive speed limitation at control node 5, which is a 3 mph limitation. The same 3 mph limitation is the most restrictive speed limitation at control nodes 5-9. At node 10, the most restrictive speed limitation is a 4 mph speed limitation. However, at node 11, the most restrictive speed limitation is a 1.6 mph speed limitation. In this case, control speed manager 123 may determine that, in order to reach the 1.6 mph speed limitation at control node 11, deceleration curve 324 begins decelerating, in accordance with the deceleration capabilities of vehicle 140, at point 331. In this case, deceleration curve 324 may begin decelerating at point 331 in order to reach the 1.6 mph speed limitation at control node 11. In this case, although the most restrictive speed limitation at control node 10 is a 4 mph limitation, due to the deceleration capabilities of vehicle 140, the deceleration curve 324 may not accelerate toward the 4 mph limitation at control node 10, but may rather decelerate toward the 1.6 mph speed limitation at control node 11, not reaching the 4 mph limitation at control node 10. At node 11, after reaching the 1.6 mph limitation, deceleration curve 324 may accelerate to 4 mph, which may be maximum speed that allows deceleration curve 324 to reach the most restrictive speed limitation at control node 13, which is a 3 mph limitation. Deceleration curve 324 may maintain the 3 mph speed through nodes 13 and 14, as the most restrictive speed limitation at control nodes 13 and 14 is the 3 mph speed limitation. As current window does not extend beyond control node 14, deceleration curve 324 generated by control speed manager 123 may be limited to the range including control nodes 1-14 and no more. In this manner, it is noted that deceleration curve 324 generated by control speed manager 123 based on the limitations associated with control nodes 1-14 is confined to the current viewing window 310.

In embodiments, control speed manager 123 may be configured to combine the acceleration curve (e.g., acceleration curve 322) and the deceleration curve (e.g., deceleration curve 324) into a speed profile to be included in the control speed plan. As illustrated in FIG. 3D, speed profile 320 may be generated by combining acceleration curve 322 and deceleration curve 324. In some embodiments, combining acceleration curve 322 and deceleration curve 324 may include overlaying one curve over the other one and removing any instantaneous acceleration and deceleration from the combined curve. The result of the combination may be a speed profile based on the acceleration and deceleration capabilities of vehicle 140 and based on the limitations of each control node within the current viewing window. Control speed manager 123 may include speed profile 320 in the control speed plan.

In embodiments, control speed manager 123 may be configured to output the control speed plan to a speed controller of vehicle 140. The speed controller of vehicle 140 may be configured to adjust the speed of vehicle 140 according to the control speed plan for the current viewing window.

Figure 4B:
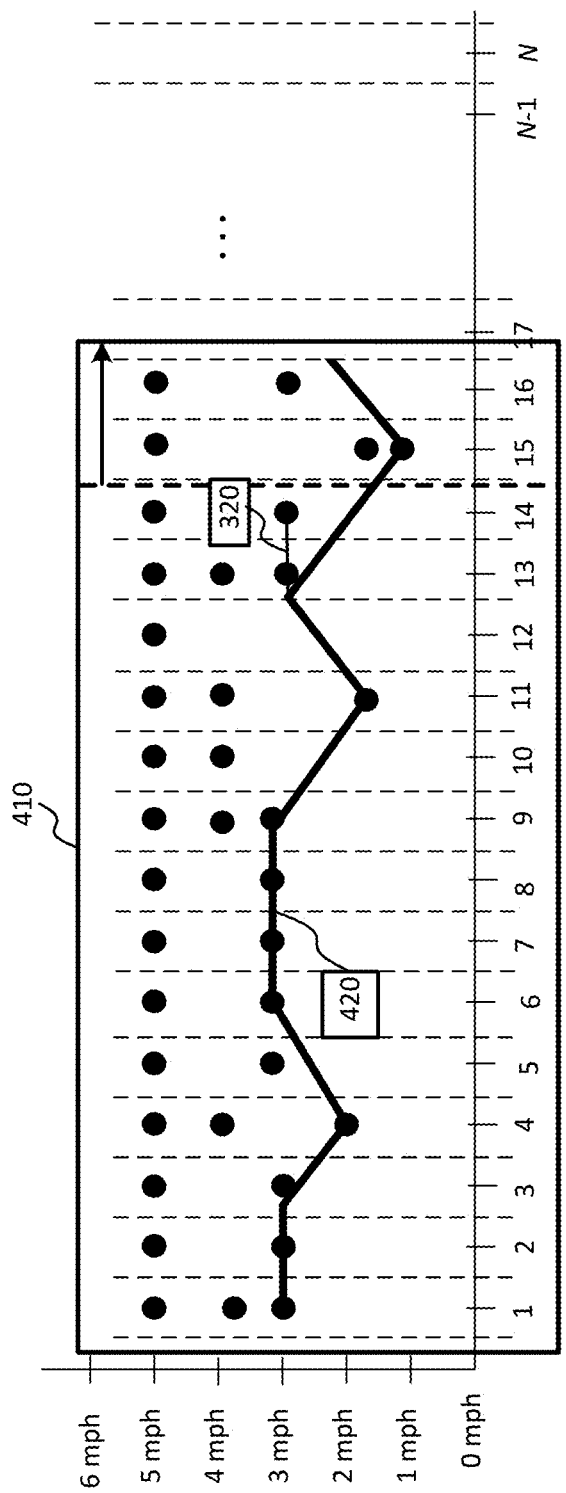
FIG. 4B is a diagram illustrating an example of a control speed plan generated for a modified viewing window in accordance with embodiments of the present disclosure.

In embodiments, control speed manager 123 may be configured to generate a control speed plan, or to modify an existing control speed plan for a current viewing window, for vehicle 140 based on one or more operating conditions for each control node within a modified viewing window. For example, as discussed above with respect to FIG. 4A, current viewing window 310 may be increased or expanded to include additional control nodes upon a determination that the additional control nodes have been validated. For example, upon determination that control nodes 15 and 16 are validated, current window 310 may be expanded into expanded viewing window 410 to include newly validated control nodes 15 and 16. In embodiments, one or more operating conditions, which may include speed limitations, may be determined for newly validated control nodes 15 and 16 based on rulesets respectively associated with each of nodes 15 and 16. In embodiments, control speed manager 123 may be configured to generate a control speed plan for expanded viewing window 410 based on the limitations associated with each of control nodes 1-16, as expanded viewing window 410 may include controls nodes 1-16. For example, FIG. 4B is a diagram illustrating an example of a control speed plan generated for a modified viewing window in accordance with embodiments of the present disclosure. In embodiments, the control speed plan generated for the modified viewing window may include an optimal control speed for vehicle 140 at each control node of the control nodes within the modified viewing window based on the one or more operating conditions determined for each control node within the modified viewing window and a speed profile indicating an acceleration or deceleration curve to be followed through each of the optimal control speeds in the control speed plan for the modified viewing window when executing the control speed plan for the modified viewing window.

In embodiments, the speed profile through control nodes in a control speed plan for a current viewing window may change when generated for a control speed plan for a modified viewing window. For example, as illustrated in FIG. 4B, speed profile 420 may be based on control nodes 1-16, rather than control nodes 1-4 as speed profile 320 in FIG. 3D. In this example, speed profile 420 may be different from speed profile 320. In particular, at control node 13, speed profile 320 may accelerate and maintain a 3 mph speed through control nodes 13 and 14. However, speed profile 420, which may be additionally based on control nodes 15 and 16, may instead begin decelerating before control node 13 in order to reach a 1 mph speed limitation at control node 15. It is noted that, without the visibility into control nodes 15 and 16, control speed manager 123 may generate speed profile 320, which does not begin decelerating at control node 13 since control speed manager 123 is unaware of the 1 mph speed limitation at control node 15. In this manner, the functionality of system 100 allows for adaptation to changing conditions. System 100, as such, is flexible and responsive to adjust to additional information, which may allow for a system that is more robust than existing systems, which are unable to adapt to changing conditions.

Figure 5A:
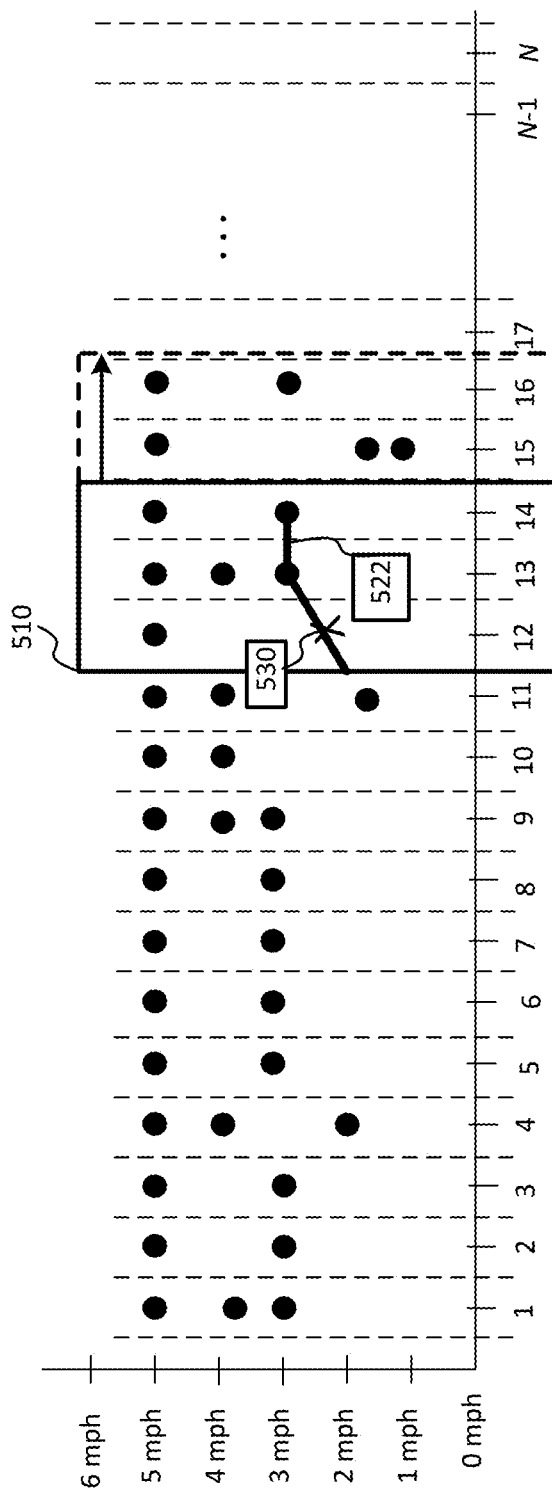
FIG. 5A shows a diagram of a sliding viewing window including one or more control nodes in accordance with embodiments of the present disclosure.
Figure 5B:
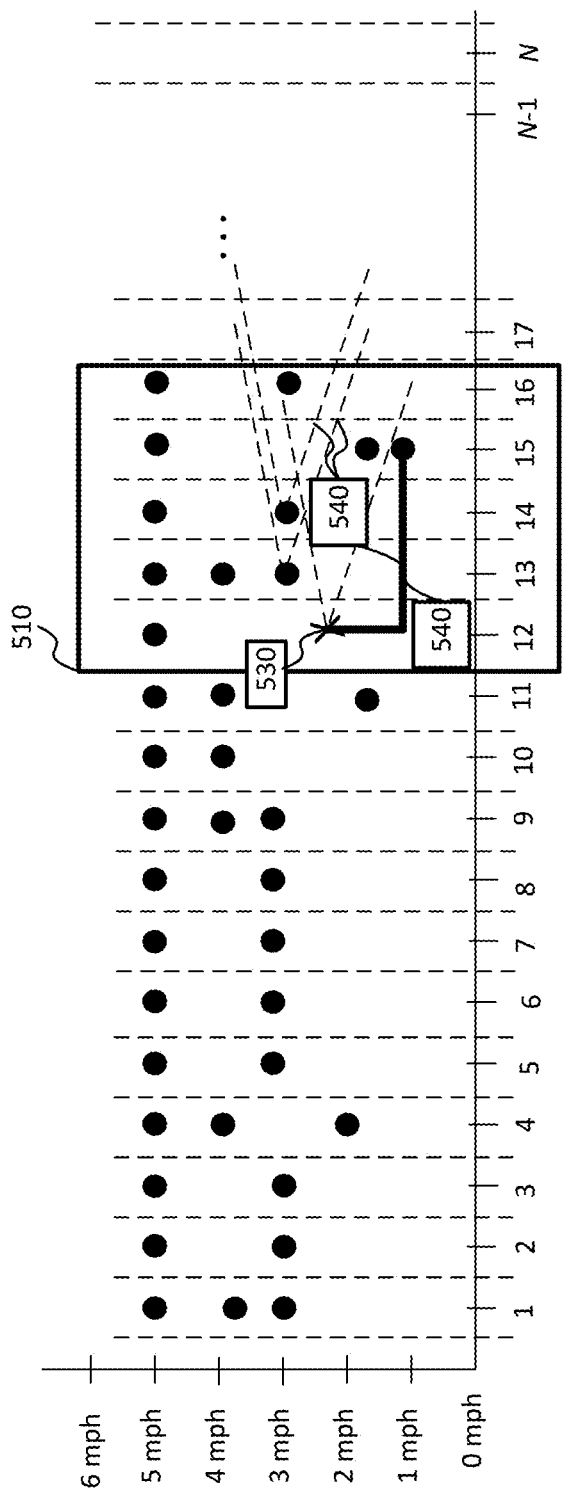
FIG. 5B shows a diagram of a sliding viewing window including additional control nodes in a first (e.g., normal) control operation in accordance with embodiments of the present disclosure.
Figure 5C:
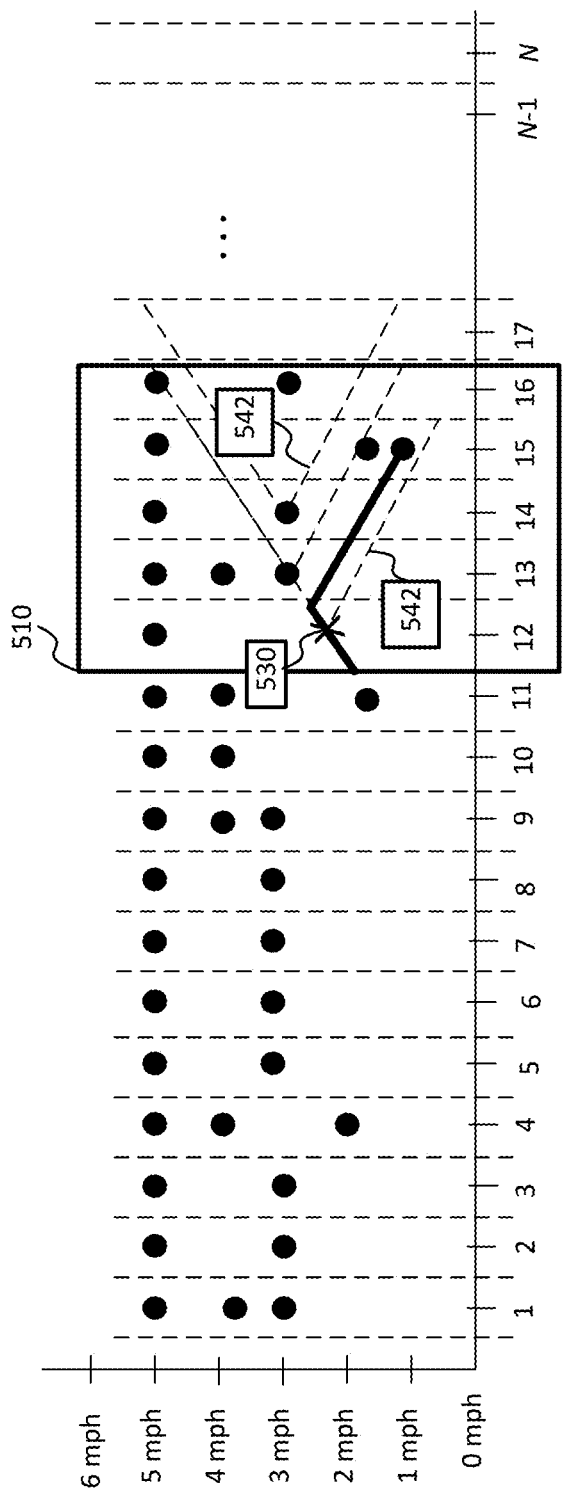
FIG. 5C shows a diagram of a sliding viewing window including additional control nodes in second (e.g., safety) control operation in accordance with embodiments of the present disclosure.
Figure 5D:
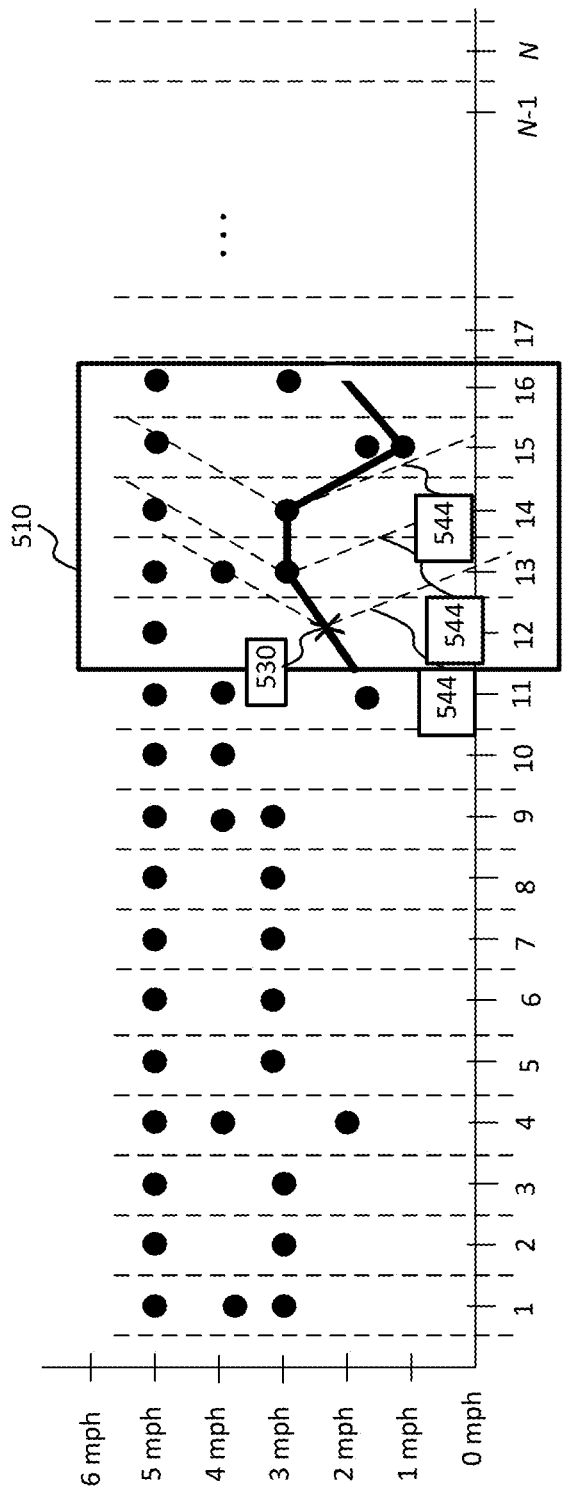
FIG. 5D shows a diagram of a sliding viewing window including additional control nodes in third (e.g., emergency) control operation in accordance with embodiments of the present disclosure.

In another example, such as the one illustrated in FIGS. 5A-5D, the current viewing window may be a sliding viewing window. In embodiments, control speed manager 123 may be configured to dynamically generate or modify a control speed plan for vehicle 140 based on the sliding viewing window. For example, FIG. 5A shows a diagram of a sliding viewing window including one or more control nodes in accordance with embodiments of the present disclosure. As shown in FIG. 5A, sliding window 510 may currently include control nodes 12-14. In accordance with functionality described herein, a control speed plan including speed profile 522 may be executed. The control speed plan may be configured to control vehicle 140 during operation to reach a speed of 2.3 at point 530 of control node 12 while accelerating to 3 mph at control node 13 and maintain the 3 mph speed through control node 14. Currently at control node 12, sliding window 510 may not have visibility beyond control node 14, and the control speed plan including speed profile 522 may be generated based on the current visibility of sliding window 510, namely control nodes 12-15. During control node 12, sliding window may slide or increase to include additional nodes. For example, sliding window 510 may slide to include control nodes 15 and 16, in additional to current control nodes 12-14. In this manner, sliding window 510 may now include visibility into control nodes 15 and 16. In embodiments, control speed manager 123 may be configured to dynamically modify the control speed plan include speed profile 530 based on the additional visibility into control nodes 15 and 16, and in particular, based on the limitations associated with control nodes 15 and 16. For example, control node 15 may be associated with a speed limitation of 1 mph, which is the most restrictive limitation of control node 15. In embodiments, control speed manager 123 may be configured to determine, based on the acceleration and/or deceleration capabilities of vehicle 140 and the limitations associated with the additional control nodes, whether speed profile 530 is to be modified, and if so, how speed profile 530 is to be modified. FIGS. 5B-5D illustrate examples of the functionality of control speed manager 123 to determine modifications to speed profile 530.

FIG. 5B shows a diagram of a sliding viewing window including additional control nodes in first (e.g., normal) control operation in accordance with embodiments of the present disclosure. It is noted that the example illustrated in FIG. 5B is related to acceleration/deceleration capabilities of vehicle 140 based on a normal control mode of operation. As shown in FIG. 5B, control speed manager 123 may determine an acceleration/deceleration profile at each control node previously included in sliding window 510 (e.g., control nodes 12-14). The acceleration/deceleration profile at each control node previously included in sliding window 510 may provide insight into whether limitations of the newly added control nodes may be met based on the normal control acceleration/deceleration profile of vehicle 140. In particular, control node 15 may include a speed limitation of 1 mph. In this example, at node 12, vehicle 140 may be operating at a speed of 2.3 mph according to speed profile 522. The normal control deceleration profile 540 of vehicle 140 may indicate that, even if vehicle 140 begins decelerating at node 12, the speed limitation of 1 mph at node 15 may not be reached, as the deceleration profile of vehicle 140 in normal control mode is not sufficient to decrease the speed of vehicle 140 from the 2.3 mph speed at node 12 to the 1 mph speed limitation at node 15. In this case, control speed manager 123 may either begin decelerating as soon as determining that the speed limitation of 1 mph at node 15 may not be reached or may instead request a control speed of 1 mph to the speed controller of vehicle 140 and allow speed controller to control operations of vehicle 140 to reach, or approximate, the 1 mph speed limitation at node 15, which may provide control beyond the parameters provided to the system for normal speed operations.

FIG. 5C shows a diagram of a sliding viewing window including additional control nodes in second (e.g., safety) control operation in accordance with embodiments of the present disclosure. It is noted that the example illustrated in FIG. 5C is related to acceleration/deceleration capabilities of vehicle 140 based on a safety control mode of operation. As shown in FIG. 5C, control speed manager 123 may determine an acceleration/deceleration profile at each control node previously included in sliding window 510 (e.g., control nodes 12-14). The acceleration/deceleration profile at each control node previously included in sliding window 510 may provide insight into whether limitations of the newly added control nodes may be met based on the safety control acceleration/deceleration profile of vehicle 140. In particular, control node 15 may include a speed limitation of 1 mph. In this example, at node 12, vehicle 140 may be operating at a speed of 2.3 mph according to speed profile 522. A safety control deceleration profile 542 of vehicle 140 may indicate that, if vehicle 140 begins decelerating at node 12, the speed limitation of 1 mph at node 15 may be reached without any issues. Safety control deceleration profile 542 of vehicle 140, when applied to node 13, may indicate that, if vehicle 140 begins decelerating at node 13, which may be at 3 mph according to speed profile 522, the speed limitation of 1 mph at node 15 may not be reached. Safety control deceleration profile 542 of vehicle 140, when applied to node 14, may indicate that, if vehicle 140 begins decelerating at node 13, which may be at 3 mph according to speed profile 522, the speed limitation of 1 mph at node 15 may not be reached. In this case, control speed manager 123 may generate a control speed plan that may include a modification to the current speed profile 522 and may include a deceleration at node 12 configured to ensure that the speed limitation of 1 mph at node 15 is reached, or at a point between nodes 12 and 13 (e.g., a selected point independent of the nodes themselves).

FIG. 5D shows a diagram of a sliding viewing window including additional control nodes in third (e.g., emergency) control operation in accordance with embodiments of the present disclosure. It is noted that the example illustrated in FIG. 5D is related to acceleration/deceleration capabilities of vehicle 140 based on an emergency control mode of operation. As shown in FIG. 5D, control speed manager 123 may determine an acceleration/deceleration profile at each control node previously included in sliding window 510 (e.g., control nodes 12-14). The acceleration/deceleration profile at each control node previously included in sliding window 510 may provide insight into whether limitations of the newly added control nodes may be met based on the acceleration/deceleration profile of vehicle 140. In particular, control node 15 may include a speed limitation of 1 mph. In this example, at node 12, vehicle 140 may be operating at a speed of 2.3 mph according to speed profile 522. An emergency control deceleration profile 544 of vehicle 140 may indicate that, if vehicle 140 begins decelerating at node 12, the speed limitation of 1 mph at node 15 may be reached without any issues. Emergency control deceleration profile 544 of vehicle 140, when applied to node 13, may indicate that, if vehicle 140 begins decelerating at node 13, which may be at 3 mph according to speed profile 522, the speed limitation of 1 mph at node 15 may be reached without any issues. Emergency control deceleration profile 544 of vehicle 140, when applied to node 14, may indicate that, if vehicle 140 begins decelerating at node 14, which may be at 3 mph according to speed profile 522, the speed limitation of 1 mph at node 15 may be reached without any issues. In this case, control speed manager 123 may generate a control speed plan without modifying the current speed profile 522 and including a deceleration after control node 14 to reach the 1 mph limitation at control node 15.

Figure 6:
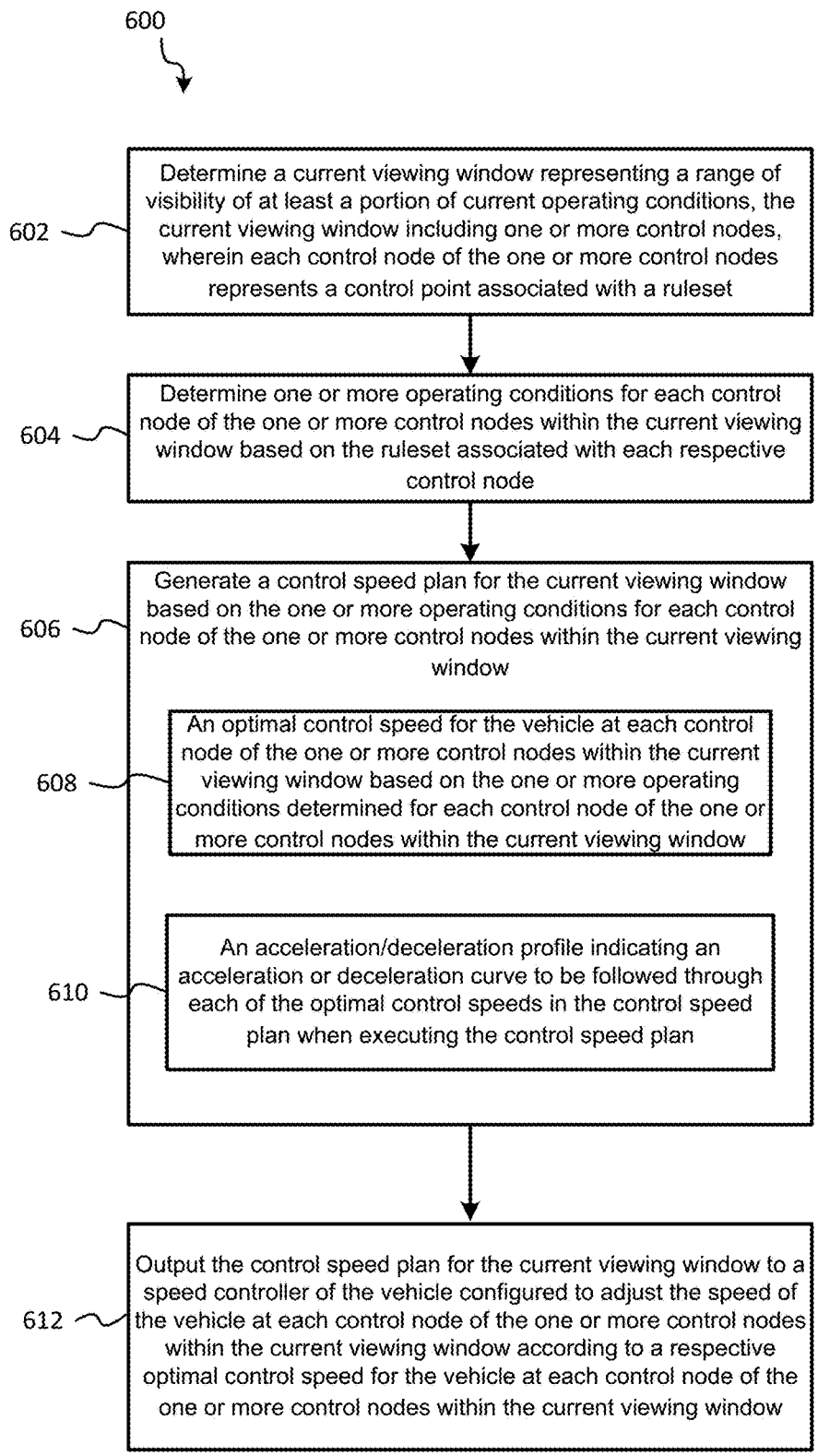
FIG. 6 shows a high-level flow diagram of operation of a system for providing selection of a control speed for a remote-controlled vehicle based on rulesets applied to control nodes within a viewing window in accordance with embodiments of the present disclosure.

FIG. 6 shows a high-level flow diagram 600 of operation of a system configured for providing selection of a control speed for a remote-controlled vehicle based on rulesets applied to control nodes within a viewing window in accordance with embodiments of the present disclosure. For example, the functions illustrated in the example blocks shown in FIG. 6 may be performed by system 100 of FIG. 1 according to embodiments herein. In embodiments, the operations of the method 600 may be stored as instructions that, when executed by one or more processors, cause the one or more processors to perform the operations of the method 600.

At block 602, a current viewing window representing a range of visibility of at least a portion of current operating conditions may be determined. In embodiments, the current viewing window may include one or more control nodes, and each control node of the one or more control nodes may represent a control point associated with a ruleset. In embodiments, functionality of a viewing window manager (e.g., viewing window manager 121) may be used to determine a current viewing window representing a range of visibility of at least a portion of current operating conditions. In embodiments, the viewing window manager may perform operations to determine a current viewing window representing a range of visibility of at least a portion of current operating conditions according to operations and functionality as described above with reference to viewing window manager 121 and as illustrated in FIGS. 1-5D.

At block 604, one or more operating conditions for each control node of the one or more control nodes within the current viewing window based on the ruleset associated with each respective control node may be determined. In embodiments, functionality of a viewing window limitations determining logic (e.g., viewing window limitations determining logic 122) may be used to determine one or more operating conditions for each control node of the one or more control nodes within the current viewing window based on the ruleset associated with each respective control node. In embodiments, the viewing window limitations determining logic may perform operations to determine one or more operating conditions for each control node of the one or more control nodes within the current viewing window based on the ruleset associated with each respective control node according to operations and functionality as described above with reference to viewing window limitations determining logic 122 and as illustrated in FIGS. 1-5D.

At block 606, a control speed plan for the current viewing window may be generated based on the one or more operating conditions for each control node of the one or more control nodes within the current viewing window. In embodiments, the control speed plan for the current viewing window may include an optimal control speed (e.g., optimal control speed 608) for the vehicle 140 at each control node of the one or more control nodes within the current viewing window based on the one or more operating conditions determined for each control node of the one or more control nodes within the current viewing window. In embodiments, the control speed plan for the current viewing window may include a speed profile (e.g., speed profile 610) indicating an acceleration or deceleration curve to be followed through each of the optimal control speeds in the control speed plan when executing the control speed plan. In embodiments, functionality of a control speed manager (e.g., control speed manager 123) may be used to generate a control speed plan for the current viewing window based on the one or more operating conditions for each control node of the one or more control nodes within the current viewing window. In embodiments, the control speed manager may perform operations to generate a control speed plan for the current viewing window based on the one or more operating conditions for each control node of the one or more control nodes within the current viewing window according to operations and functionality as described above with reference to control speed manager 123 and as illustrated in FIGS. 1-5D.

At block 606, the control speed plan for the current viewing window may be output to a speed controller of the vehicle configured to adjust the speed of the vehicle at each control node of the one or more control nodes within the current viewing window according to a respective optimal control speed for the vehicle at each control node of the one or more control nodes within the current viewing window. In embodiments, functionality of a control speed manager (e.g., control speed manager 123) may be used to output the control speed plan for the current viewing window to a speed controller of the vehicle configured to adjust the speed of the vehicle at each control node of the one or more control nodes within the current viewing window according to a respective optimal control speed for the vehicle at each control node of the one or more control nodes within the current viewing window. In embodiments, the control speed manager may perform operations to output the control speed plan for the current viewing window to a speed controller of the vehicle configured to adjust the speed of the vehicle at each control node of the one or more control nodes within the current viewing window according to a respective optimal control speed for the vehicle at each control node of the one or more control nodes within the current viewing window according to operations and functionality as described above with reference to control speed manager 123 and as illustrated in FIGS. 1-5D.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of generating a control speed plan for vehicle in a current viewing window based on one or more control nodes, comprising:
    identifying a lowest speed allowed for the vehicle within the control node within a current viewing window, wherein the control speed plan for the current viewing window includes a control speed for the vehicle at each control node of the one or more control nodes within the current viewing window based on the lowest speed allowed for the vehicle determined for each control node of the one or more control nodes within the current viewing window;
    generating a speed profile of the control speed plan for the current viewing window based on the lowest speed allowed for the vehicle for each control node, wherein generating the speed profile of the control speed plan includes:
        determining an acceleration curve for the current viewing window based on the lowest speed allowed for the vehicle for each control node, by instantiating an ideal deceleration capability for the vehicle and an actual acceleration capability of the vehicle and generating the acceleration curve based on the ideal deceleration and actual acceleration capabilities of the vehicle;
        determining a deceleration curve for the current viewing window based on lowest speed allowed for the vehicle for each control node, by instantiating an ideal acceleration capability for the vehicle and an actual deceleration capability of the vehicle and generating the deceleration curve based on the ideal acceleration and actual deceleration capabilities of the vehicle; and
        combining the acceleration curve and the deceleration curve to generate the speed profile; and
    outputting the control speed plan to a speed controller of the vehicle configured to adjust the speed of the vehicle at each control node of the one or more control nodes within the current viewing window according to the speed profile of the control speed plan for the current viewing window.

2. The method of claim 1, wherein the current viewing window represents a range of visibility of at least a portion of current operating conditions.

3. The method of claim 1, wherein the current viewing window is determined by:
    validating the one or more control nodes; and
    including the one or more control nodes in the current viewing window.

4. The method of claim 3, wherein validating the one or more control nodes includes determining that the one or more control nodes are present during the operation for determining the control speed for the vehicle.

5. The method of claim 1, wherein each control node of the one or more control nodes represents a control point associated with a ruleset.

6. The method of claim 5, wherein the ruleset associated with each respective control node includes one or more rules, each of the one or more rules related to a different operating condition and configured to define the operating condition based on one or more operational factors.

7. The method of claim 6, wherein each of the one or more rules included in a ruleset is defined as a rule table.

8. The method of claim 1, further comprising:
expanding the current viewing window into an expanded viewing window to include one or more additional control nodes.

9. The method of claim 8, further comprising:
determining one or more additional operating conditions for each of the one or more additional control nodes within the expanded viewing window based on rulesets associated with the one or more additional control nodes.

10. The method of claim 9, further comprising:
updating the control speed plan based on the one or more additional operating conditions for each of the one or more additional control nodes within the expanded viewing window.

11. A system for generating a control speed plan for vehicle in a current viewing window based on one or more control nodes, comprising:
at least one processor; and
a memory operably coupled to the at least one processor and storing processor-readable code that, when executed by the at least one processor, is configured to perform operations including:
identifying a lowest speed allowed for a vehicle within the control node within a current viewing window, wherein the control speed plan for the current viewing window includes a control speed for the vehicle at each control node of the one or more control nodes within the current viewing window based on the lowest speed allowed for the vehicle determined for each control node of the one or more control nodes within the current viewing window; and
generating a speed profile of the control speed plan for the current viewing window based on the lowest speed allowed for the vehicle for each control node, wherein generating the speed profile of the control speed plan includes:
determining an acceleration curve for the current viewing window based on the lowest speed allowed for the vehicle for each control node, by instantiating an ideal deceleration capability for the vehicle and an actual acceleration capability of the vehicle and generating the acceleration curve based on the ideal deceleration and actual acceleration capabilities of the vehicle;
determining a deceleration curve for the current viewing window based on lowest speed allowed for the vehicle for each control node, by instantiating an ideal acceleration capability for the vehicle and an actual deceleration capability of the vehicle and generating the deceleration curve based on the ideal acceleration and actual deceleration capabilities of the vehicle; and
combining the acceleration curve and the deceleration curve to generate the speed profile; and
outputting the control speed plan to a speed controller of the vehicle configured to adjust the speed of the vehicle at each control node of the one or more control nodes within the current viewing window according to the speed profile of the control speed plan for the current viewing window.

12. The system of claim 11, wherein the current viewing window represents a range of visibility of at least a portion of current operating conditions.

13. The system of claim 11, wherein the current viewing window is determined by:
validating the one or more control nodes; and
including the one or more control nodes in the current viewing window.

14. The system of claim 13, wherein validating the one or more control nodes includes determining that the one or more control nodes are present during the operation for determining the control speed for the vehicle.

15. The system of claim 11, wherein each control node of the one or more control nodes represents a control point associated with a ruleset.

16. The system of claim 15, wherein the ruleset associated with each respective control node includes one or more rules, each of the one or more rules related to a different operating condition and configured to define the operating condition based on one or more operational factors.

17. The system of claim 16, wherein each of the one or more rules included in a ruleset is defined as a rule table.

18. The system of claim 11, the operations further comprising:
expanding the current viewing window into an expanded viewing window to include one or more additional control nodes.

19. The system of claim 18, the operations further comprising:
determining one or more additional operating conditions for each of the one or more additional control nodes within the expanded viewing window based on rulesets associated with the one or more additional control nodes.

20. The system of claim 9, the operations further comprising:
updating the control speed plan based on the one or more additional operating conditions for each of the one or more additional control nodes within the expanded viewing window.

* * * * *